US012687695B2

(12) United States Patent
Teranishi

(10) Patent No.: US 12,687,695 B2
(45) Date of Patent: Jul. 21, 2026

(54) CAMERA OPTICAL LENS

(71) Applicant: AAC OPTICS (CHANGZHOU) CO., LTD., Changzhou (CN)

(72) Inventor: Takaaki Teranishi, Osaka (JP)

(73) Assignee: AAC OPTICS (CHANGZHOU) CO., LTD., Changzhou (CN)

( * ) Notice: Subject to any disclaimer, the term of this patent is extended or adjusted under 35 U.S.C. 154(b) by 332 days.

(21) Appl. No.: 18/402,736

(22) Filed: Jan. 3, 2024

(65) Prior Publication Data

US 2025/0102769 A1 Mar. 27, 2025

(30) Foreign Application Priority Data

Sep. 22, 2023 (CN) .......................... 202311235920.7

(51) Int. Cl.
| | |
|---|---|
| *G02B 9/64* | (2006.01) |
| *G02B 13/00* | (2006.01) |
| *G02B 21/02* | (2006.01) |
| *G02B 21/36* | (2006.01) |

(52) U.S. Cl.
CPC .............. *G02B 9/64* (2013.01); *G02B 13/00* (2013.01); *G02B 13/0045* (2013.01); *G02B 21/02* (2013.01); *G02B 21/361* (2013.01)

(58) Field of Classification Search
None
See application file for complete search history.

(56) References Cited

U.S. PATENT DOCUMENTS

2020/0033562 A1* 1/2020 Tomioka .................. G02B 7/04
2023/0367186 A1* 11/2023 Ikegami ................. H04N 23/12

* cited by examiner

*Primary Examiner* — Richard H Kim
(74) *Attorney, Agent, or Firm* — Wiersch Law Group

(57) ABSTRACT

The present disclosure relates to the field of camera optical lenses, and discloses a camera optical lens. The camera optical lens includes from an object side to an image side: a first lens, a second lens, a third lens, a fourth lens, and a fifth lens, a sixth lens, a seventh lens, an eighth lens and ninth lens, a tenth lens, an eleventh lens, and a twelfth lens, following relational expressions are satisfied: $-0.80 \leq f12/f10\_11 \leq -0.50$; $0.80 \leq f7/f \leq 1.80$; $-83.00 \leq f56/(d9+d11) \leq -4.00$; and $0.40 \leq NA*f/WD \leq 0.60$. The camera optical lens of the present disclosure has good optical performance, and has the characteristics of low distortion, large magnification and long working distance.

15 Claims, 12 Drawing Sheets

Longitudinal Aberration

Millimeter

Longitudinal Aberration

Millimeter

Lateral Color

Micrometer

Field Curvature                    Distortion

Millimeter                          Percentage

Longitudinal Aberration

Millimeter

Longitudinal Aberration

Millimeter

Lateral Color

Field Curvature          Distortion

50

Longitudinal Aberration

Millimeter

60

Longitudinal Aberration

Millimeter

Lateral Color

CAMERA OPTICAL LENS

TECHNICAL FIELD

The disclosure relates to the field of camera optical lenses, in particular to a camera optical lens suitable for an industrial microscope.

BACKGROUND

The microscope objective lens can complete its specific imaging function with a certain field of view, focal length and relative aperture, but these optical characteristic parameters are mutually restricted by the optical imaging principle. The microscope objective lens needs to have the characteristic of high resolution by a large numerical aperture, but the higher the magnification of the microscope objective lens, the larger the numerical aperture, the more obvious the influence of thickness and refractive index changes on the imaging quality of the microscope, and it is generally difficult to consider both high imaging quality and high magnification. In addition, with the development of technologies and the increase of diversified requirements of users and the requirements of the system on the imaging quality are continuously increased, the structure of the twelve-piece lens gradually occurs in the lens design. There is an urgent need for camera optical lenses with good optical performance while having low distortion, large magnification and long working distance.

SUMMARY

In view of the above problems, an object of the present disclosure is to provide a camera optical lens, which can meet the requirements of low distortion, large magnification and long working distance with good optical performance.

In order to solve the above technical problem, the present disclosure provides a camera optical lens. The camera optical lens includes from an object side to an image side: a first lens, a second lens, a third lens, a fourth lens, a fifth lens, a sixth lens, a seventh lens, an eighth lens, a ninth lens, a tenth lens, an eleventh lens, and a twelfth lens;

wherein a focal length of the camera optical lens is f, a combined focal length of the fifth lens and the sixth lens is f56, an on-axis thickness of the fifth lens is d9, an on-axis thickness of the sixth lens is d11, a focal length of the seventh lens is f7, a combined focal length of the tenth lens and the eleventh lens is f10_11, a focal length of the twelfth lens is f12, a working distance of the camera optical lens is WD, and a numerical aperture of the camera optical lens is NA, following relational expressions are satisfied:

$$-0.80 \le f12/f10\_11 \le -0.50;$$

$$0.80 \le f7/f \le 1.80;$$

$$-83.00 \le f56/(d9 + d11) \le -4.00; \text{ and}$$

$$0.40 \le NA * f/WD \le 0.60.$$

As an improvement, an on-axis thickness of the fourth lens d7, an on-axis distance from an image-side surface of the fourth lens to an object-side surface of the fifth lens d8, a following relational expression is satisfied:

$$1.00 \le d7/d8 \le 22.50.$$

As an improvement, the first lens has a positive refractive power, and an object-side surface of the first lens is convex in a paraxial region;

a focal length of the first lens is f1, a central curvature radius of the object-side surface of the first lens is R1, a central curvature radius of an image-side surface of the first lens is R2, an on-axis thickness of the first lens is d1, and a total optical length from the object-side surface of the first lens to an image plane of the camera optical lens along an optic axis of the camera optical lens is TTL, following relational expressions are satisfied:

$$0.98 \le f1/f \le 1.58;$$

$$1.26 \le (R1 + R2)/(R1 - R2) \le -0.83; \text{ and}$$

$$0.02 \le d1/TTL \le 0.09.$$

As an improvement, the second lens has a negative refractive power, an object-side surface of the second lens is concave in a paraxial region, and an image-side surface of the second lens is concave in the paraxial region;

a focal length of the second lens is f2, a central curvature radius of an object-side surface of the second lens is R3, a central curvature radius of an image-side surface of the second lens is R4, an on-axis thickness of the second lens is d3, and a total optical length from an object-side surface of the first lens to an image plane of the camera optical lens along an optic axis of the camera optical lens is TTL, following relational expressions are satisfied:

$$-1.10 \le f2/f \le -0.80;$$

$$0.78 \le (R3 + R4)/(R3 - R4) \le 0.96; \text{ and}$$

$$0.00 \le d3/TTL \le 0.03.$$

As an improvement, the third lens has a negative refractive power, an object-side surface of the third lens is concave in a paraxial region, and an image-side surface of the third lens is concave in the paraxial region;

a focal length of the third lens is f3, a central curvature radius of an object-side surface of the third lens is R5, a central curvature radius of an image-side surface of the third lens is R6, an on-axis thickness of the third lens is d5, and a total optical length from an object-side surface of the first lens to an image plane of the camera optical lens along an optic axis of the camera optical lens is TTL, following relational expressions are satisfied:

$$-0.75 \le f3/f \le -0.56;$$

$$-0.85 \le (R5 + R6)/(R5 - R6) \le -0.30; \text{ and}$$

$$0.00 \le d5/TTL \le 0.03.$$

As an improvement, the fourth lens has a positive refractive power, an object-side surface of the fourth lens is convex in a paraxial region, and an image-side surface of the fourth lens is convex in the paraxial region;

a focal length of the fourth lens is f4, a central curvature radius of an object-side surface of the fourth lens is R7, a central curvature radius of an image-side surface of the fourth lens is R8, an on-axis thickness of the fourth lens is d7, and a total optical length from an object-side surface of the first lens to an image plane of the camera optical lens along an optic axis of the camera optical lens is TTL, following relational expressions are satisfied:

$$0.62 \le f4/f \le 0.95;$$

$$0.16 \le (R7 + R8)/(R7 - R8) \le 1.00; \text{ and}$$

$$0.04 \le d7/TTL \le 0.10.$$

As an improvement, the fifth lens has a negative refractive power, an object-side surface of the fifth lens is concave in a paraxial region, and an image-side surface of the fifth lens is concave in the paraxial region;

a focal length of the fifth lens is f5, a central curvature radius of an object-side surface of the fifth lens is R9, a central curvature radius of an image-side surface of the fifth lens is R10, and a total optical length from an object-side surface of the first lens to an image plane of the camera optical lens along an optic axis of the camera optical lens is TTL, following relational expressions are satisfied:

$$-1.20 \le f5/f \le -0.55;$$

$$-0.41 \le (R9 + R10)/(R9 - R10) \le -0.24; \text{ and}$$

$$0.00 \le d9/TTL \le 0.03.$$

As an improvement, the sixth lens has a positive refractive power, an object-side surface of the sixth lens is convex in a paraxial region, and an image-side surface of the sixth lens is convex in the paraxial region;

a focal length of the sixth lens is f6, a central curvature radius of an object-side surface of the sixth lens is R11, a central curvature radius of an image-side surface of the sixth lens is R12, and a total optical length from an object-side surface of the first lens to an image plane of the camera optical lens along an optic axis of the camera optical lens is TTL, following relational expressions are satisfied:

$$1.11 \le f6/f \le 1.45;$$

$$-0.10 \le (R11 + R12)/(R11 - R12) \le 025; \text{ and}$$

$$0.05 \le d11/TTL \le 0.10.$$

As an improvement, the seventh lens has a positive refractive power, an object-side surface of the seventh lens is convex in a paraxial region, and an image-side surface of the seventh lens is convex in the paraxial region;

a central curvature radius of the object-side surface of the seventh lens is R13, a central curvature radius of the image-side surface of the seventh lens is R14, an on-axis thickness of the seventh lens is d13, and a total optical length from an object-side surface of the first lens to an image plane of the camera optical lens along an optic axis of the camera optical lens is TTL, following relational expressions are satisfied:

$$-0.60 \le (R13 + R14)/(R13 - R14) \le 0.15; \text{ and}$$

$$0.04 \le d13/TTL \le 0.07.$$

As an improvement, the eighth lens has a negative refractive power, and an image-side surface of the eighth lens is concave in a paraxial region;

a focal length of the eighth lens is f8, a central curvature radius of an object-side surface of the eighth lens is R15, a central curvature radius of an image-side surface of the eighth lens is R16, an on-axis thickness of the eighth lens is d15, and a total optical length from an object-side surface of the first lens to an image plane of the camera optical lens along an optic axis of the camera optical lens is TTL, following relational expressions are satisfied:

$$-3.10 \le f8/f \le -0.69;$$

$$0.14 \le (R15 + R16)/(R15 - R16) \le 3.00; \text{ and}$$

$$0.00 \le d15/TTL \le 0.04.$$

As an improvement, the ninth lens has a positive refractive power, an object-side surface of the ninth lens is convex in a paraxial region, and an image-side surface of the ninth lens is convex in the paraxial region;

a focal length of the ninth lens is f9, a central curvature radius of an object-side surface of the ninth lens is R17, a central curvature radius of an image-side surface of the ninth lens is R18, an on-axis thickness of the ninth lens is d17, and a total optical length from an object-side surface of the first lens to an image plane of the camera optical lens along an optic axis of the camera optical lens is TTL, following relational expressions are satisfied:

$$0.84 \le f9/f \le 1.79;$$

$$-0.90 \le (R17 + R18)/(R17 - R18) \le -0.14; \text{ and}$$

$$0.08 \le d17/TTL \le 0.14.$$

As an improvement, the tenth lens has a positive refractive power, an object-side surface of the tenth lens is convex in a paraxial region, and an image-side surface of the tenth lens is convex in the paraxial region;

a focal length of the tenth lens is f10, a central curvature radius of an object-side surface of the tenth lens is R19, a central curvature radius of an image-side surface of the tenth lens is R20, an on-axis thickness of the tenth lens is d19, an on-axis thickness of the tenth lens is d19, and a total optical length from an object-side surface of the first lens to an image plane of the camera optical lens along an optic axis of the camera optical lens is TTL, following relational expressions are satisfied:

$$0.90 \leq f10/f \leq 1.15;$$

$$-0.45 \leq (R19 + R20)/(R19 - R20) \leq 0.00; \text{ and}$$

$$0.06 \leq d19/TTL \leq 0.15.$$

As an improvement, the eleventh lens has a negative refractive power, an object-side surface of the eleventh lens is concave in a paraxial region, and an image-side surface of the eleventh lens is concave in the paraxial region; a focal length of the eleventh lens is f11, a central curvature radius of an object-side surface of the eleventh lens is R21, a central curvature radius of an image-side surface of the eleventh lens is R22, an on-axis thickness of the eleventh lens is d21, and a total optical length from an object-side surface of the first lens to an image plane of the camera optical lens along an optic axis of the camera optical lens is TTL, following relational expressions are satisfied:

$$-0.69 \leq f11/f \leq -0.50;$$

$$0.35 \leq (R21 + R22)/(R21 - R22) \leq 0.60; \text{ and}$$

$$0.00 \leq d21/TTL \leq 0.03.$$

As an improvement, the twelfth lens has a positive refractive power, and an object-side surface of the twelfth lens is convex in a paraxial region; a focal length of the twelfth lens is f12, a central curvature radius of an object-side surface of the twelfth lens is R23, a central curvature radius of an image-side surface of the twelfth lens is R24, an on-axis thickness of the twelfth lens is d23, and a total optical length from an object-side surface of the first lens to an image plane of the camera optical lens along an optic axis of the camera optical lens is TTL, following relational expressions are satisfied:

$$0.93 \leq f12/f \leq 1.33;$$

$$-1.35 \leq (R23 + R24)/(R23 - R24) \leq -0.65;$$

and $$0.04 \leq d23/TTL \leq 0.15.$$

As an improvement, the first lens, the second lens, the third lens, the fourth lens, the fifth lens, the sixth lens, the seventh lens, the eighth lens, the ninth lens, the tenth lens, the eleventh lens and the twelfth lens are all made of glass.

DESCRIPTION OF EMBODIMENTS

In order to more clearly illustrate objectives, technical solutions, and advantages of embodiments of the present disclosure, the technical solutions in embodiments of the present disclosure are clearly and completely described in details with reference to the accompanying drawings. However, those of ordinary skill in the art will appreciate that in various embodiments of the present disclosure, numerous technical details are set forth for the reader to better understand the present disclosure. However, the technical solutions claimed in the present disclosure can be implemented even without these technical details and various variations and modifications based on the following embodiments.

Embodiment 1

Figure 1:
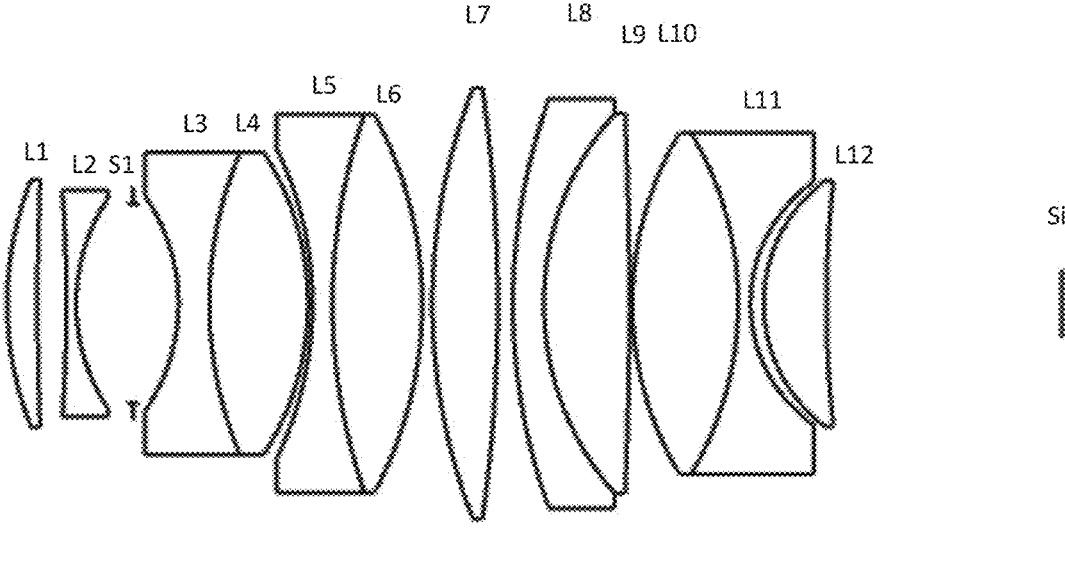
FIG. 1 is a schematic structural diagram of a camera optical lens according to Embodiment 1 of the present disclosure.

Referring to the drawings, the present disclosure provides a camera optical lens 10. FIG. 1 shows a camera optical lens

10 as described in Embodiment 1 of the present disclosure, the camera optical lens 10 includes twelve lenses. The camera optical lens 10 includes from an object side to an image side: a first lens L1, a second lens L2, an aperture S1, a third lens L3, a fourth lens L4, a fifth lens L5, a sixth lens L6, a seventh lens L7, an eighth lens L8, a ninth lens L9, a tenth lens L10, an eleventh lens L11, and a twelfth lens L12. An optical element such as an optical filter may be disposed between the twelfth lens L12 and the image surface Si.

A combined focal length of the tenth lens L10 and the eleventh lens L11 is defined as f10_11, a focal length of the twelfth lens L12 is defined as f12, $-0.80 \le f12/f10\_11 \le -0.50$, which specifies a range of a ratio of the object-side end lens group to the focal length closest to the object lens, and it can be ensured that the image-side light has sufficient convergence capability.

A focal length of the seventh lens L7 is defined as f7, a focal length of the camera optical lens 10 is defined as f, $0.80 \le f7/f \le 1.80$, which specifies a ratio of the seventh lens L7 to the total focal length f of the system, and the total length of the camera optical lens 10 can be effectively controlled while the aberration is corrected to ensure the imaging quality. A combined focal length of the fifth lens L5 and the sixth lens L6 is defined as f56, an on-axis thickness of the fifth lens L5 is defined as d9, an on-axis thickness of the sixth lens L6 is defined as d11, $-83.00 \le f56/(d9+d11) \le -4.00$, which specifies a range of a ratio of the combined focal length of the fifth lens L5 and the sixth lens L6 to a sum of an on-axis thickness d9 of the fifth lens L5 and an on-axis thickness d11 of the sixth lens L6, so that it can be ensured that there is sufficient refractive power while maintaining a reasonable lens thickness, which is beneficial to correct distortion, so that | Distortion |≤1%.

A working distance of the camera optical lens (that is, an on-axis distance from the object surface to the object-side surface of the first lens L1) is defined as WD, a numerical aperture of the camera optical lens 10 is defined as NA, $0.40 \le NA*f/WD \le 0.60$, which specifies the conditions met by the numerical aperture and resolution of the camera optical lens 10, and within a range of the relational expression, the camera optical lens 10 has a relatively large numerical aperture and a high resolution.

When the distance from the object-side surface of the first lens L1 of the camera optical lens 10 to the observed object, the total optical length from the object-side surface of the first lens to an image plane of the camera optical lens along an optic axis, the numerical aperture, the focal length, the related focal length and the on-axis thickness satisfy the above relational expression, the camera optical lens 10 can have good optical performance and have the characteristics of low distortion, large magnification and long working distance, wherein the magnification can reach 5 times.

An on-axis thickness of the fourth lens L4 is defined as d7, and an on-axis distance from an image-side surface of the fourth lens L4 to an object-side surface of the fifth lens L5 is d8, following relational expression is satisfied: $1.00 \le d7/d8 \le 22.50$, which specifies a ratio of the thickness d7 of the fourth lens L5 to the air spacing between the fourth lens L4 and the fifth lens L5, which helps to assemble the lenses in the range of the relational expression.

In this embodiment, the first lens L1 is made of glass, the second lens L2 is made of glass, the third lens L3 is made of glass, the fourth lens L4 is made of glass, the fifth lens L5 is made of glass, the sixth lens L6 is made of glass, the seventh lens L7 is made of glass, the eighth lens L8 is made of glass, the ninth lens L9 is made of glass, the tenth lens L10 is made of glass, the eleventh lens L11 is made of glass, and the twelfth lens L12 is made of glass.

In this embodiment, an object-side surface of the first lens L1 is convex in a paraxial region, an image-side surface of the first lens L1 is concave in the paraxial region, and the first lens L1 has a positive refractive power. In other optional embodiments, an object-side surface and the image-side surface of the first lens L1 may also be provided with other concave and convex distributions, and the first lens L1 may also have a negative refractive power.

A focal length of the first lens L1 is f1, a following relational expression is satisfied: $0.98 \le f1/f \le 1.58$, through reasonable distribution of refractive powers, the system has better imaging quality and lower sensitivity.

A central curvature radius of an object-side surface of the first lens L1 is defined as R1, and a central curvature radius of the image-side surface of the first lens L1 is defined as R2, a following relational expression is satisfied: $-1.26 \le (R1+R2)/(R1-R2) \le -0.83$, a shape of the first lens L1 is reasonably controlled, so that the first lens can effectively correct the spherical aberration of the system.

An on-axis thickness of the first lens L1 is d1, and a total optical length from the object-side surface of the first lens to an image plane of the camera optical lens along an optic axis of the camera optical lens 10 is TTL, a following relational expression is satisfied: $0.02 \le d1/TTL \le 0.09$, which helps to assemble the lenses, and is beneficial to controlling the thickness of the lens and the total length of the camera lens.

In this embodiment, an object-side surface of the second lens L2 is concave in a paraxial region, an image-side surface of the second lens L2 is concave in the paraxial region, and the second lens L2 has a negative refractive power. In other optional embodiments, the object-side surface and the image-side surface of the second lens L2 may also be provided with other concave and convex distribution, and the second lens L2 may also have a positive refractive power.

A focal length of the second lens L2 is f2, a following relational expression is satisfied: $-1.10 \le f2/f \le -0.80$, through reasonable distribution of refractive powers, the system has better imaging quality and lower sensitivity.

A central curvature radius of an object-side surface of the second lens L2 is R3, and a central curvature radius of an image-side surface of the second lens L2 is R4, a following relational expression is satisfied: $0.78 \le (R3+R4)/(R3-R4) \le 0.96$, which specifies a shape of the second lens L2, and within the specified range of the relational expression, the deflection degree of light passing through the lens can be mitigated, thereby effectively reducing aberration.

An on-axis thickness of the second lens L2 is d3, and a total optical length from the object-side surface of the first lens to an image plane of the camera optical lens along an optic axis of the camera optical lens 10 is TTL, a following relational expression is satisfied: $0.00 \le d3/TTL \le 0.03$, which helps to assemble the lenses, and is beneficial to controlling the thickness of the lens and the total length of the camera lens.

In this embodiment, an object-side surface of the third lens L3 is concave in a paraxial region, an image-side surface of the third lens L3 is concave in the paraxial region, and the third lens L3 has a negative refractive power. In other optional embodiments, the object-side surface and the image-side surface of the third lens L3 may also be provided with other concave and convex distributions, and the third lens L3 may also have a positive refractive power.

A focal length of the third lens L3 is f3, a following relational expression is satisfied: $-0.75 \le f3/f \le -0.56$, through reasonable distribution of refractive powers, the system has better imaging quality and lower sensitivity.

A central curvature radius of an object-side surface of the third lens L3 is R5, and a central curvature radius of an image-side surface of the third lens L3 is R6, a following relational expression is satisfied: $-0.85 \leq (R5+R6)/(R5-R6) \leq -0.30$, which specifies a shape of the third lens L3, and within the specified range of the relational expression, the deflection degree of light passing through the lens can be mitigated, thereby effectively reducing aberration.

An on-axis thickness of the third lens L3 is d5, and a total optical length from the object-side surface of the first lens to an image plane of the camera optical lens along an optic axis of the camera optical lens 10 is TTL, a following relational expression is satisfied: $0.00 \leq d5/TTL \leq 0.03$, which helps to assemble the lenses, and is beneficial to controlling the thickness of the lens and the total length of the camera lens.

In this embodiment, an object-side surface of the fourth lens L4 is convex in a paraxial region, an image-side surface of the fourth lens L4 is convex in the paraxial region, and the fourth lens L4 has a positive refractive power. In other optional embodiments, the object-side surface and the image-side surface of the fourth lens L4 may also be provided with other concave and convex distributions, and the fourth lens L4 may also have a negative refractive power.

A focal length of the fourth lens L4 is f4, a following relational expression is satisfied: $0.62 \leq f4/f \leq 0.95$, which specifies a ratio of the focal length f4 of the fourth lens L4 to the system focal length f, and helps improve the performance of the optical system within the range of the relational expression.

A central curvature radius of an object-side surface of the fourth lens L4 is R7, and a central curvature radius of an image-side surface of the fourth lens L4 is R8, a following relational expression is satisfied. $0.16 \leq (R7+R8)/(R7-R8) \leq 1.00$, which specifies a shape of the fourth lens L4, and within the specified range of the conditional expression, the deflection degree of light passing through the lens can be mitigated, thereby effectively reducing aberration.

An on-axis thickness of the fourth lens L4 is d7, and a total optical length from the object-side surface of the first lens to an image plane of the camera optical lens along an optic axis of the camera optical lens 10 is TTL, a following relational expression is satisfied: $0.04 \leq d7/TTL \leq 0.10$, which helps to assemble the lenses, and is beneficial to controlling the thickness of the lens and the total length of the camera lens.

In this embodiment, an object-side surface of the fifth lens L5 is concave in a paraxial region, an image-side surface of the fifth lens L5 is concave in the paraxial region, and the fifth lens L5 has a positive refractive power. In other optional embodiments, the object-side surface and the image-side surface of the fifth lens L5 may also be provided with other concave and convex distributions, and the fifth lens L5 may have negative refractive power.

A focal length of the fifth lens L5 is f5, a following relational expression is satisfied: $-1.20 \leq f5/f \leq -0.55$, which specifies a ratio of the focal length f5 of the fifth lens L5 to the system focal length f, and helps improve the performance of the optical system within the range of the relational expression.

A central curvature radius of an object-side surface of the fifth lens L5 is R9, and a central curvature radius of an image-side surface of the fifth lens L5 is R10, a following relational expression is satisfied: $-0.41 \leq (R9+R10)/(R9-R10) \leq -0.24$, which specifies a shape of the fifth lens L5, and within the specified range of the relational expression, a deflection degree of light passing through the lens can be mitigated, thereby effectively reducing aberration.

An on-axis thickness of the fifth lens L5 is d9, a following relational expression is satisfied: $0.00 \leq d9/TTL \leq 0.03$, which helps to assemble the lenses, and is beneficial to controlling the thickness of the lens and the total length of the camera lens.

In this embodiment, an object-side surface of the sixth lens L6 is convex in a paraxial region, an image-side surface of the sixth lens L6 is convex in the paraxial region, and the sixth lens L6 has a positive refractive power. In other optional embodiments, the object-side surface and the image-side surface of the sixth lens L6 may also be provided with other concave and convex distributions, and the sixth lens L6 may also have a negative refractive power.

A focal length of the sixth lens L6 is f6, a following relational expression is satisfied: $1.11 \leq f6/f \leq 1.45$, which specifies a ratio of the focal length f6 of the sixth lens L6 to the system focal length f, helps improve the performance of the optical system within the range of the relational expression.

A central curvature radius of an object-side surface of the sixth lens L6 is R11, and a central curvature radius of an image-side surface of the sixth lens L6 is R12, a following relational expression is satisfied: $-0.10 \leq (R11+R12)/(R11-R12) \leq 0.25$, which specifies the shape of the sixth lens L6, and within a specified range of the relational expression, a deflection degree of light passing through the lens can be mitigated, thereby effectively reducing aberration.

An on-axis thickness of the sixth lens L6 is d11, a following relational expression is satisfied: $0.05 \leq d11/TTL \leq 0.10$, which helps to assemble the lenses, and is beneficial to controlling the thickness of the lens and the total length of the camera lens.

In this embodiment, an object-side surface of the seventh lens L7 is convex in a paraxial region, an image-side surface of the seventh lens L7 is convex in the paraxial region, and the seventh lens L7 has a positive refractive power. In other optional embodiments, the object-side surface and the image-side surface of the seventh lens L7 may also be provided with other concave and convex distributions, and the seventh lens L7 may also have a negative refractive power.

A central curvature radius of an object-side surface of the seventh lens L7 is R13, a central curvature radius of an image-side surface of the seventh lens L7 is R14, a following relational expression is satisfied: $-0.60 \leq (R13+R14)/(R13-R14) \leq 0.15$. A shape of the seventh lens L7 is specified, and within a specified range of the relational expression, a deflection degree of light passing through the lens can be mitigated, thereby effectively reducing aberration.

The on-axis thickness of the seventh lens L7 is d13, a following relational expression is satisfied: $0.04 \leq d13/TTL \leq 0.07$, which helps to assemble the lenses, and is beneficial to controlling the thickness of the lens and the total length of the camera lens.

In this embodiment, an object-side surface of the eighth lens L8 is convex in a paraxial region, an image-side surface of the eighth lens L8 is concave in the paraxial region, and the eighth lens L8 has a negative refractive power. In other optional embodiments, the object-side surface and the image-side surface of the eighth lens L8 may also be provided with other concave and convex distributions, and the eighth lens L8 may also have a positive refractive power.

A focal length of the eighth lens L8 is f8, a following relational expression is satisfied: $-3.10 \leq f8/f \leq -0.69$, which specifies a ratio of the focal length f8 of the eighth lens L8 to the system focal length f, and helps to improve the performance of the optical system within the range of the relational expression.

A central curvature radius of an object-side surface of the eighth lens L8 is R15, a central curvature radius of an image-side surface of the seventh lens is R16, a following relational expression is satisfied: $0.14 \leq (R15+R16)/(R15-R16) \leq 3.00$. A shape of the eighth lens L8 is specified, and within a specified range of the relational expression, a deflection degree of light passing through the lens can be mitigated, thereby effectively reducing aberration.

An on-axis thickness of the eighth lens L8 is d15, a following relational expression is satisfied: $0.00 \leq d15/TTL \leq 0.04$, which helps to assemble the lenses, and is beneficial to controlling the thickness of the lens and the total length of the camera lens.

In this embodiment, an object-side surface of the ninth lens L9 is convex in a paraxial region, an image-side surface of the ninth lens L9 is convex in the paraxial region, and the ninth lens L9 has a positive refractive power. In other optional embodiments, the object-side surface and the image-side surface of the ninth lens L9 may also be provided with other concave and convex distributions, and the ninth lens L9 may have negative refractive power.

A focal length of the ninth lens L9 is f9, a following relational expression is satisfied: $0.84 \leq f9/f \leq 1.79$, which specifies a ratio of the focal length f9 of the ninth lens L9 to the system focal length f, and helps improve the performance of the optical system within the range of the relational expression.

A central curvature radius of an object-side surface of the ninth lens L9 is R17, and a central curvature radius of an image-side surface of the ninth lens 19 is R18, a following relational expression is satisfied: $-0.90 \leq (R17+R18)/(R17-R18) \leq -0.14$, a shape of the ninth lens L9 is specified, and within the specified range of the relational expression, a deflection degree of light passing through the lens can be mitigated, thereby effectively reducing aberration.

An on-axis thickness of the ninth lens is d17, a following relational expression is satisfied: $0.08 \leq d17/TTL \leq 0.14$, which helps to assemble the lenses, and is beneficial to controlling the thickness of the lens and the total length of the camera lens.

In this embodiment, an object-side surface of the tenth lens L10 is convex in the paraxial region, an image-side surface of the tenth lens L10 is convex in the paraxial region, and the tenth lens L10 has a positive refractive power. In other optional embodiments, the object-side surface and the image-side surface of the tenth lens L10 may also be provided with other concave and convex distributions, and the tenth lens L10 may also have a negative refractive power.

A focal length of the tenth lens L10 is f10, a following relational expression is satisfied: $0.90 \leq f10/f \leq 1.15$; a ratio of the focal length f10 of the tenth lens L10 to the system focal length f is specified, which helps improve the performance of the optical system within the range of the relational expression.

A central curvature radius of an object-side surface of the tenth lens L10 is R19, a central curvature radius of an image-side surface of the tenth lens L10 is R20, a following relational expression is satisfied: $-0.45 \leq (R19+R20)/(R19-R20) \leq 0.00$ is satisfied.

An on-axis thickness of the tenth lens L10 is d19, a following relational expression is satisfied: $0.06 \leq d19/TTL \leq 0.15$, which helps to assemble the lenses, and is beneficial to controlling the thickness of the lens and the total length of the camera lens.

In this embodiment, the object-side surface of the eleventh lens L11 is concave in a paraxial region, the image-side surface of the eleventh lens L11 is concave in the paraxial region, and the eleventh lens L11 has a negative refractive power. In other optional embodiments, the object-side surface and the image-side surface of the eleventh lens L11 may also provided with other concave and convex distributions, and the eleventh lens L11 may also have a positive refractive power.

A focal length of the eleventh lens is f11, a following relational expression is satisfied: $-0.69 \leq f11/f \leq -0.50$, which specifies a ratio of the focal length f11 of the eleventh lens L11 to the system focal length f, and helps to improve the performance of the optical system within the range of the relational expression.

A central curvature radius of an object-side surface of the eleventh lens L11 is R21, a central curvature radius of an image-side surface of the eleventh lens is R22, $0.35 \leq (R21+R22)/(R21-R22) \leq 0.60$, and within a specified range of the relational expression, a deflection degree of light passing through the lens can be mitigated, thereby effectively reducing aberration.

An on-axis thickness of an eleventh lens L11 is d21, a following relational expression is satisfied: $0.00 \leq d21/TTL \leq 0.03$, which helps to assemble the lenses, and is beneficial to controlling the thickness of the lens and the total length of the camera lens.

In this embodiment, an object-side surface of the twelfth lens L12 is convex in a paraxial region, an image-side surface of the twelfth lens L12 is concave in the paraxial region, and the twelfth lens L12 has a positive refractive power. In other optional embodiments, an object-side surface and the image-side surface of the twelfth lens L12 may also be provided with other concave and convex distributions, and the twelfth lens L12 may also have a negative refractive power.

A focal length of the twelfth lens L12 is f12, a following relational expression is satisfied: $0.93 \leq f12/f \leq 1.33$, which specifies a ratio of the focal length f12 of the twelfth lens L12 to the system focal length f, and helps to improve the performance of the optical system within the range of the relational expression.

A central curvature radius of an object-side surface of the twelfth lens L12 is R23, and a central curvature radius of an image-side surface of the twelfth lens L12 is R24, a following relational expression is satisfied: $-1.35 \leq (R23+R24)/(R23-R24) \leq -0.65$, which specifies a shape of the twelfth lens L12, and within the specified range of the relational expression, a deflection degree of light passing through the lens can be mitigated, thereby effectively reducing aberration.

An on-axis thickness of the twelfth lens L12 is d23, a following relational expression is satisfied: $0.04 \leq d23/TTL \leq 0.15$, which helps to assemble the lenses, and is beneficial to controlling the thickness of the lens and the total length of the camera lens.

In this embodiment, an aperture S1 is provided between the second lens L2 and the third lens L3, an on-axis distance from the image-side surface of the second lens L2 to the aperture S1 is 6.490 mm, and an on-axis distance from the aperture S1 to the object-side surface of the third lens L3 is 5.110 mm.

The camera optical lens 10 of the present disclosure will be described below by way of example. The symbols recited in each example are shown below. The units of the focal length, the on-axis distance, the central curvature radius and the on-axis thickness are mm.

TTL: the unit of the total optical length from the object-side surface of the first lens to an image plane of the camera optical lens along an optic axis (an on-axis distance from the object-side surface of the first lens L1 to the image plane) is mm;

Optionally, the object-side surface and/or the image-side surface of the lens may be further provided with an inflection point and/or a stationary point, so as to meet high-quality imaging requirements, specific implementable embodiments are described below.

Table 1 shows design data of the camera optical lens 10 according to Embodiment 1 of the present disclosure.

TABLE 1

| | R | d | | nd | | vd | |
|---|---|---|---|---|---|---|---|
| OBJ | | dOBJ(WD)= | INF | | | | |
| R1 | 39.200 | d1= | 3.440 | nd1 | 1.7725 | v1 | 49.60 |
| R2 | 342.440 | d2= | 3.280 | | | | |
| R3 | −183.060 | d3= | 1.100 | nd2 | 1.5163 | v2 | 64.14 |
| R4 | 22.280 | d4= | 11.600 | | | | |
| R5 | −22.280 | d5= | 3.500 | nd3 | 1.6201 | v3 | 36.43 |
| R6 | 45.760 | d6= | 0.00 | | | | |
| R7 | 45.760 | d7= | 11.200 | nd4 | 1.5928 | v4 | 68.62 |
| R8 | −32.960 | d8= | 0.500 | | | | |
| R9 | −41.590 | d9= | 2.270 | nd5 | 1.6134 | v5 | 44.27 |
| R10 | 67.870 | d10= | 0.00 | | | | |
| R11 | 67.870 | d11= | 10.170 | nd6 | 1.5928 | v6 | 68.62 |
| R12 | −46.880 | d12= | 1.160 | | | | |
| R13 | 69.890 | d13= | 7.400 | nd7 | 1.8052 | v7 | 25.46 |
| R14 | −180.760 | d14= | 1.740 | | | | |
| R15 | 70.940 | d15= | 3.500 | nd8 | 1.6134 | v8 | 44.27 |
| R16 | 34.120 | d16= | 0.00 | | | | |
| R17 | 34.120 | d17= | 9.690 | nd9 | 1.4970 | v9 | 81.61 |
| R18 | −494.720 | d18= | 0.350 | | | | |
| R19 | 39.200 | d19= | 12.000 | nd10 | 1.5928 | v10 | 68.62 |
| R20 | −39.200 | d20= | 0.00 | | | | |
| R21 | −39.200 | d21= | 1.400 | nd11 | 1.6201 | v11 | 36.43 |
| R22 | 17.510 | d22= | 1.500 | | | | |
| R23 | 18.140 | d23= | 7.100 | nd12 | 1.4388 | v12 | 94.95 |
| R24 | 125.490 | d24= | 26.759 | | | | |

Wherein, INF represents infinite, the meaning of each symbol is as follows.

OBJ: object surface;

R: central curvature radius of the optical surface;

R1: central curvature radius of the object-side surface of the first lens L1;

R2: central curvature radius of the image-side surface of the first lens L1;

R3: central curvature radius of the object-side surface of the second lens L2;

R4: central curvature radius of the image-side surface of the second lens L2;

R5: central curvature radius of the object-side surface of the third lens L3;

R6: central curvature radius of the image-side surface of the third lens L3;

R7: central curvature radius of the object-side surface of the fourth lens L4;

R8: central curvature radius of the image-side surface of the fourth lens L4;

R9: central curvature radius of the object-side surface of the fifth lens L5;

R10: central curvature radius of the image-side surface of the fifth lens L5;

R11: central curvature radius of the object-side surface of the sixth lens L6;

R12: central curvature radius of the image-side surface of the sixth lens L6;

R13: central curvature radius of the object-side surface of the seventh lens L7;

R14: central curvature radius of the image-side surface of the seventh lens L7;

R15: central curvature radius of the object-side surface of the eighth lens L8;

R16: central curvature radius of the image-side surface of the eighth lens L8;

R17: central curvature radius of the object-side surface of the ninth lens L9;

R18: central curvature radius of the image-side surface of the ninth lens L9;

R19: central curvature radius of the object-side surface of the tenth lens L10

R20: central curvature radius of the image-side surface of the tenth lens L10;

R21: central curvature radius of the object-side surface of the eleventh lens L11;

R22: central curvature radius of the image-side surface of the eleventh lens L11;

R23: central curvature radius of the object-side surface of the twelfth lens L12;

R24: central curvature radius of the image-side surface of the twelfth lens L12;

d: on-axis thickness of the lens and an on-axis distance between the lenses;

d1: on-axis thickness of the first lens L1;

d2: on-axis distance from the image-side surface of the first lens L1 to the object-side surface of the second lens L2;

d3: on-axis thickness of the second lens L2;

d4: on-axis distance from the image-side surface of the second lens L2 to the object-side surface of the third lens L3;

d5: on-axis thickness of the third lens L3;

d6: on-axis distance from the image-side surface of the third lens L3 to the object-side surface of the fourth lens L4;

d7: on-axis thickness of the fourth lens L4;

d8: on-axis distance from the image-side surface of the fourth lens L4 to the object-side surface of the fifth lens L5;

d9: on-axis thickness of the fifth lens L5;

d10: on-axis distance from the image-side surface of the fifth lens L5 to the object-side surface of the sixth lens L6;

d11: on-axis thickness of the sixth lens L6;

d12: on-axis distance from the image-side surface of the sixth lens L6 to the object-side surface of the seventh lens L7;

d13: on-axis thickness of the seventh lens L7;

d14: on-axis distance from the image-side surface of the seventh lens L7 to the object-side surface of the eighth lens L8;

d15: on-axis thickness of the eighth lens L8;

d16: on-axis distance from the image-side surface of the eighth lens L8 to the object-side surface of the ninth lens L9;

d17: on-axis thickness of the ninth lens L9;

d18: on-axis distance from the image-side surface of the ninth lens L9 to the object-side surface of the tenth lens L10;

d19: on-axis thickness of the tenth lens L10;

d20: on-axis distance from the image-side surface of the tenth lens L10 to the object-side surface of the eleventh lens L11;

d21: on-axis thickness of the eleventh lens L11;

d22: on-axis distance from the image-side surface of the eleventh lens L11 to the object-side surface of the twelfth lens L12;

d23: on-axis thickness of the twelfth lens L12;

d24: on-axis distance from the image-side surface of the twelfth lens L12 to the object-side surface of the optical filter;

nd: refractive index of the d line;

nd1: refractive index of d line of the first lens L1;

nd2: refractive index of d line of the second lens L2;

nd3: refractive index of d line of the third lens L3;

nd4: refractive index of d line of the fourth lens L4;

nd5: refractive index of d line of the fifth lens L5;

nd6: refractive index of d line of the sixth lens L6;

nd7: refractive index of d line of the seventh lens L7;

nd8: refractive index of d line of the eighth lens L8;

nd9: refractive index of d line of the ninth lens L9;

nd10: refractive index of d line of the tenth lens L10;

nd11: refractive index of d line of the eleventh lens L11;

nd12: refractive index of d line of the twelfth lens L12;

vd: abbe number;

v1: abbe number of the first lens L1;

v2: abbe number of the second lens L2;

v3: abbe number of the third lens L3;

v4: abbe number of the fourth lens L4;

v5: abbe number of the fifth lens L5;

v6: abbe number of the sixth lens L6;

v7: abbe number of the seventh lens L7;

v8: abbe number of the eighth lens L8;

v9: abbe number of the ninth lens L9;

v10: abbe number of the tenth lens L10;

v11: abbe number of the eleventh lens L11;

v12: abbe number of the twelfth lens L12.

Figure 2:
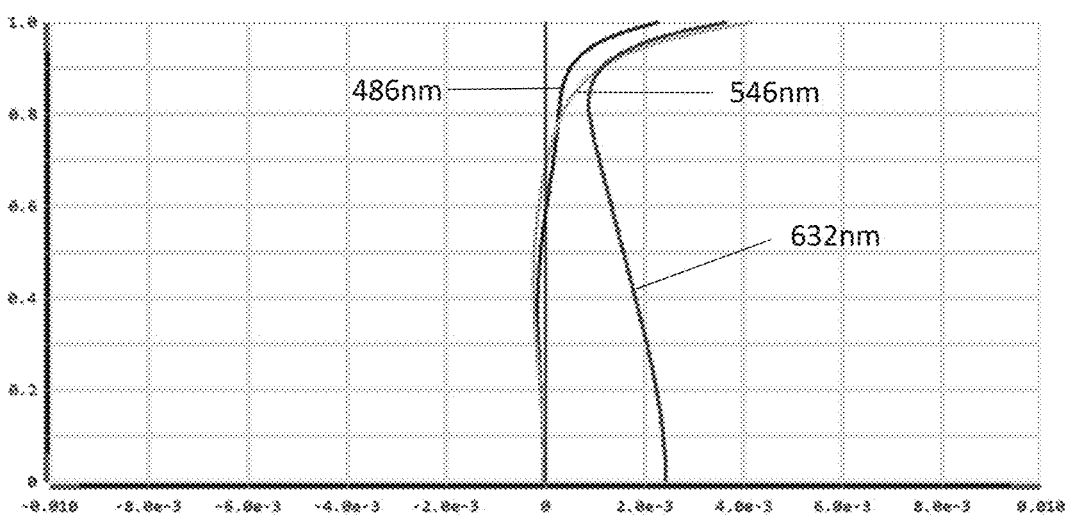
FIG. 2 is a schematic diagram of longitudinal aberration of the camera optical lens shown in FIG. 1.
Figure 3:
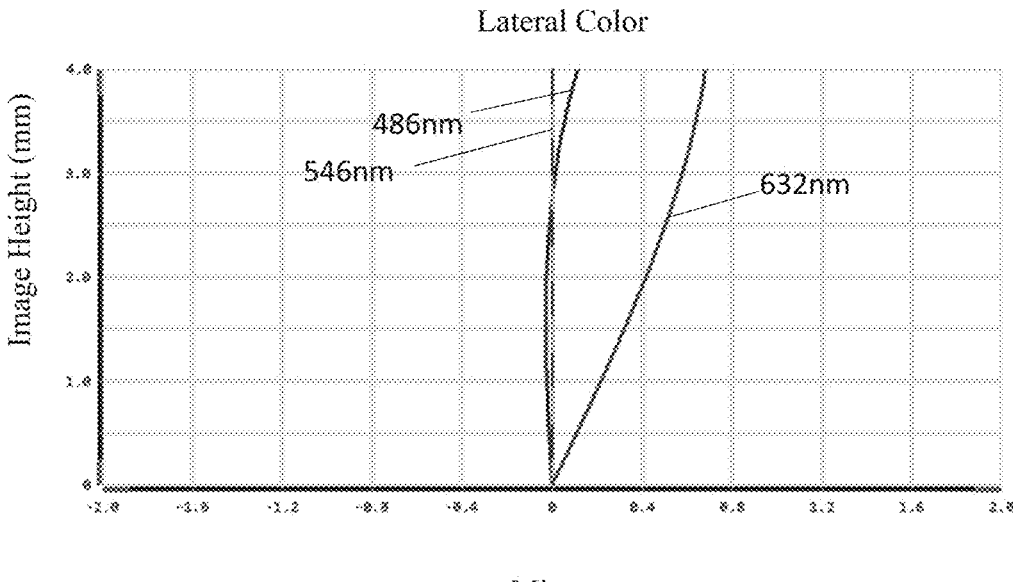
FIG. 3 is a schematic diagram of lateral color of the camera optical lens shown in FIG. 1.
Figure 4:
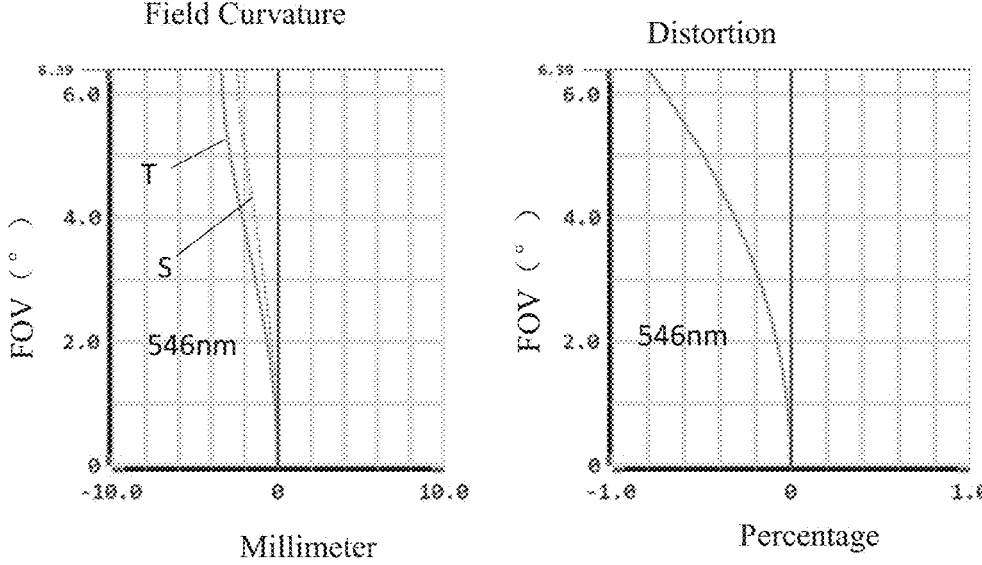
FIG. 4 is a schematic diagram of field curvature and distortion of the camera optical lens shown in FIG. 1.
Figure 5:
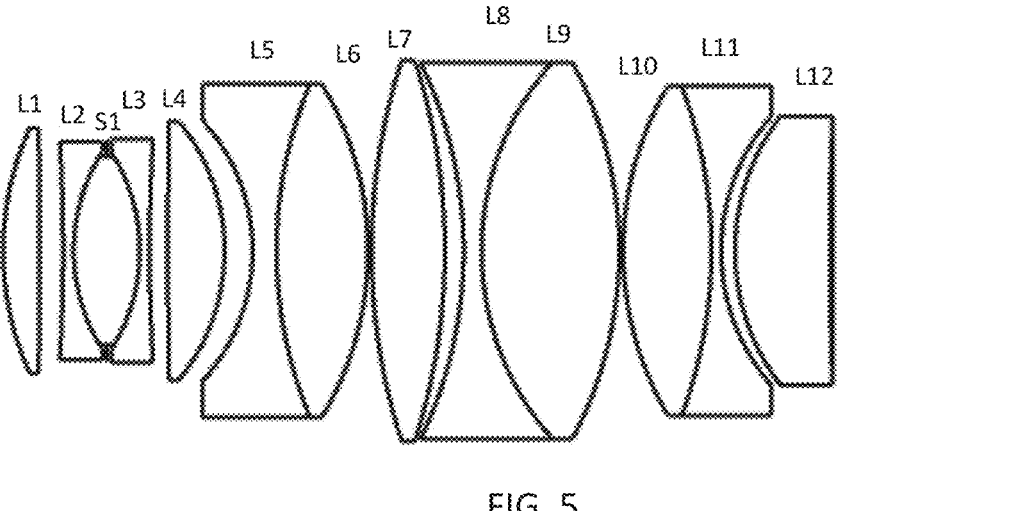
FIG. 5 is a schematic structural diagram of a camera optical lens according to Embodiment 2 of the present disclosure.

FIG. 2 and FIG. 3 respectively show longitudinal aberration and lateral color of light with wavelengths of 632 nm, 546 nm and 486 nm after passing through the camera optical lens 10 according to the first embodiment. FIG. 4 shows field curvature and distortion of light with a wavelength of 546 nm after passing through the camera optical lens 10 according to the first embodiment, the field curvature S in FIG. 4 is the field curvature in a sagittal direction, and T is the field curvature in a meridional direction.

Table 7 below shows values corresponding to various values in each example 1, example 2, example 3, example 4, example 5, example 6, and the parameters specified in the relational expression.

As shown in Table 7, Embodiment 1 satisfies each relational expression.

In this embodiment, the entrance pupil diameter of the camera optical lens is 24.765 mm, the numerical aperture is 0.35, the full field image height is 4.0 mm, and the camera optical lens has good optical performance, and characteristics of lower distortion, larger magnification and longer working distance.

Embodiment 2

Embodiment 2 is substantially the same as Embodiment 1, and the symbols have the same meaning as Embodiment 1, and only differences are listed below.

In this embodiment, an aperture S1 is provided between the second lens L2 and the third lens L3, an on-axis distance from an image-side surface of the second lens L2 to the aperture S1 is 3.710 mm, and an on-axis distance from the aperture S1 to an object-side surface of the third lens L3 is 3.740 mm.

In this embodiment, the image-side surface of the first lens L1 is convex in a paraxial region, and the object-side surface of the eighth lens L8 is concave in the paraxial region.

Table 2 shows design data of a camera optical lens 20 according to Embodiment 2 of the present disclosure.

TABLE 2

|  | R |  | d |  | nd |  | vd |
| --- | --- | --- | --- | --- | --- | --- | --- |
| OBJ |  | dOBJ(WD)= | INF |  |  |  |  |
| R1 | 34.600 | d1= | 4.110 | nd1 | 1.8040 | v1 | 46.57 |
| R2 | −850.000 | d2= | 2.640 |  |  |  |  |
| R3 | −215.000 | d3= | 1.210 | nd2 | 1.5891 | v2 | 61.25 |
| R4 | 21.700 | d4= | 7.450 |  |  |  |  |
| R5 | −21.700 | d5= | 1.100 | nd3 | 1.7847 | v3 | 25.72 |
| R6 | 215.000 | d6= | 2.060 |  |  |  |  |
| R7 | 850.000 | d7= | 6.400 | nd4 | 1.8810 | v4 | 40.16 |
| R8 | −24.000 | d8= | 3.160 |  |  |  |  |
| R9 | −22.683 | d9= | 2.700 | nd5 | 1.6034 | v5 | 38.01 |
| R10 | 50.660 | d10= | 0.00 |  |  |  |  |
| R11 | 50.660 | d11= | 10.310 | nd6 | 1.4565 | v6 | 90.27 |
| R12 | −37.870 | d12= | 0.400 |  |  |  |  |
| R13 | 72.360 | d13= | 8.270 | nd7 | 1.9229 | v7 | 20.88 |
| R14 | −72.360 | d14= | 2.110 |  |  |  |  |
| R15 | −50.660 | d15= | 2.040 | nd8 | 1.6034 | v8 | 38.01 |
| R16 | 33.410 | d16= | 0.00 |  |  |  |  |
| R17 | 33.410 | d17= | 15.520 | nd9 | 1.5540 | v9 | 71.76 |
| R18 | −46.900 | d18= | 0.430 |  |  |  |  |
| R19 | 38.000 | d19= | 9.960 | nd10 | 1.5714 | v10 | 71.62 |
| R20 | −55.000 | d20= | 0.00 |  |  |  |  |
| R21 | −55.000 | d21= | 1.100 | nd11 | 1.6989 | v11 | 30.05 |
| R22 | 24.000 | d22= | 1.560 |  |  |  |  |
| R23 | 25.840 | d23= | 10.710 | nd12 | 1.5941 | v12 | 60.47 |
| R24 | 403.200 | d24= | 26.260 |  |  |  |  |

Figure 6:
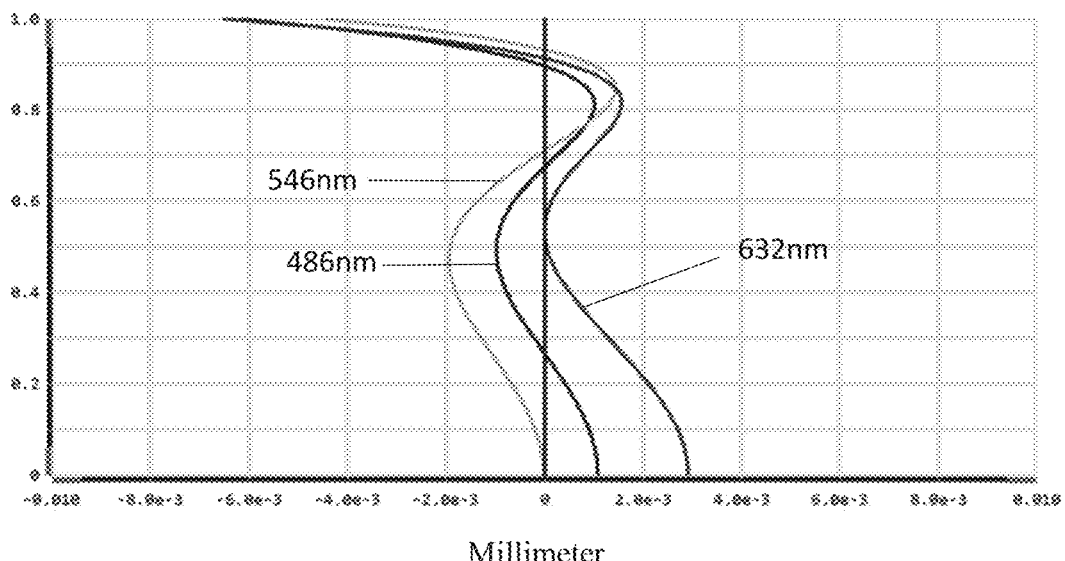
FIG. 6 is a schematic diagram of longitudinal aberration of the camera optical lens shown in FIG. 5.
Figure 7:
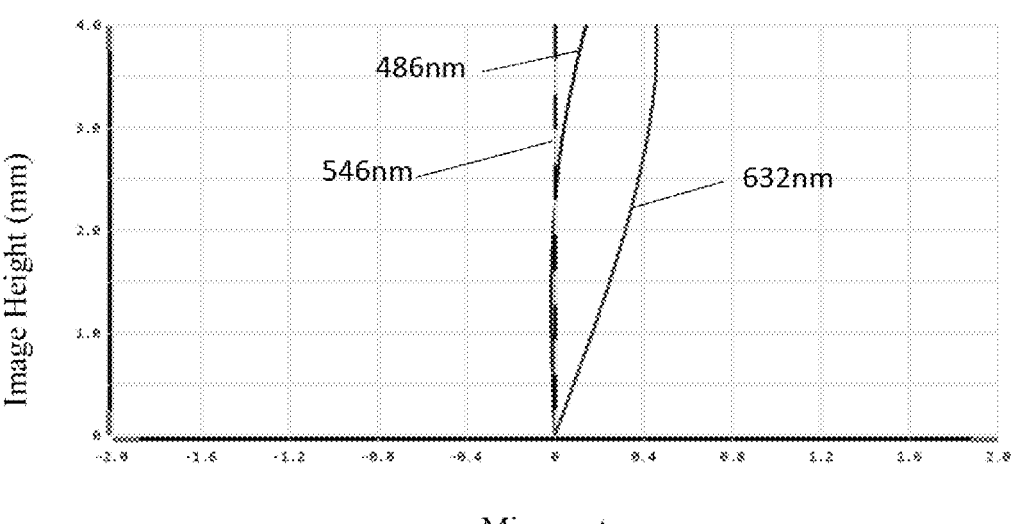
FIG. 7 is a schematic diagram of lateral color of the camera optical lens shown in FIG. 5.
Figure 8:
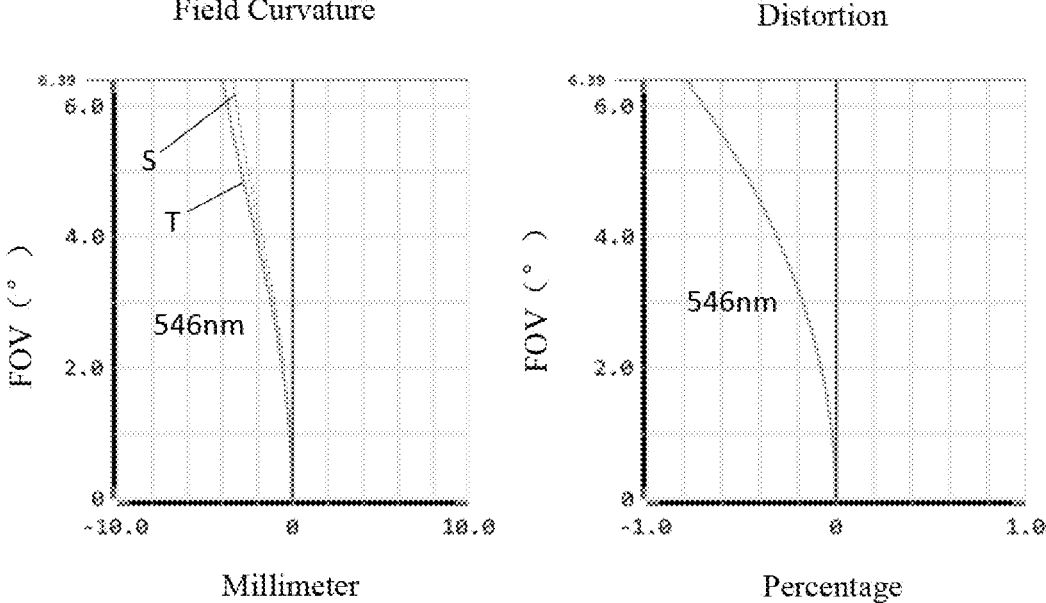
FIG. 8 is a schematic diagram of field curvature and distortion of the camera optical lens shown in FIG. 5.
Figure 9:
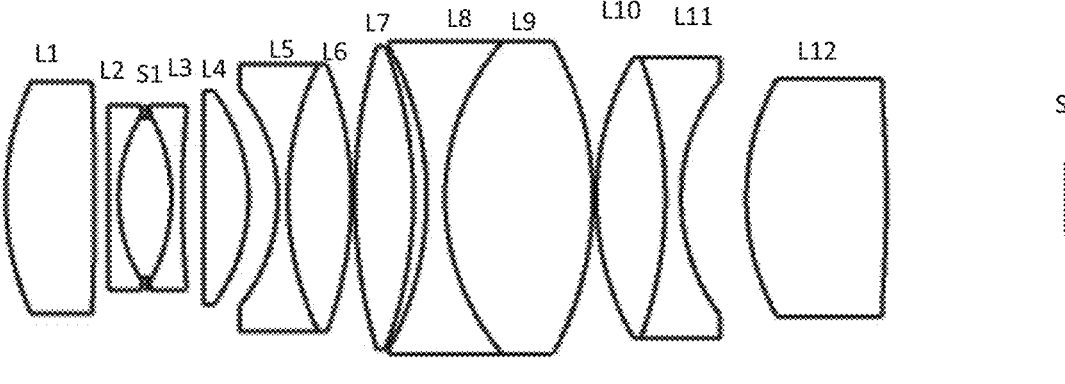
FIG. 9 is a schematic structural diagram of a camera optical lens according to Embodiment 3 of the present disclosure.

FIG. 6 and FIG. 7 respectively show longitudinal aberration and lateral color of light with wavelengths of 632 nm, 546 nm and 486 nm after passing through the camera optical lens 20 according to the second embodiment. FIG. 8 shows field curvature and distortion of light with a wavelength of 546 nm after passing through the camera optical lens according to the second embodiment, the field curvature S in FIG. 8 is the field curvature in a sagittal direction, and T is the field curvature in a meridional direction.

Table 7 below shows values corresponding to various values in each example 1, example 2, example 3, example 4, example 5, example 6, and the parameters specified in the relational expression.

As shown in Table 7, Embodiment 2 satisfies each relational expression.

In this embodiment, the entrance pupil diameter of the camera optical lens is 25.250 mm, the numerical aperture is 0.35, the full field image height is 4.0 mm, and the camera optical lens has good optical performance, and characteristics of lower distortion, larger magnification and longer working distance.

Embodiment 3

Embodiment 3 is substantially the same as Embodiment 1, and the symbols have the same meaning as Embodiment 1, and only differences are listed below.

In this embodiment, an aperture S1 is provided between the second lens L2 and the third lens L3, an on-axis distance from an image-side surface of the second lens L2 to the aperture S1 is 2.961 mm, and an on-axis distance from the aperture S1 to an object-side surface of the third lens L3 is 2.749 mm.

In this embodiment, the image-side surface of the first lens L1 is convex in a paraxial region, the object-side surface of the eighth lens L8 is concave in the paraxial region, and the image-side surface of the twelfth lens L12 is convex in the paraxial region.

Table 3 shows design data of a camera optical lens 30 according to Embodiment 3 of the present disclosure.

TABLE 3

|  | R | d |  | nd |  | vd |
| --- | --- | --- | --- | --- | --- | --- |
| OBJ |  | dOBJ(WD)= | INF |  |  |  |
| R1 | 31.233 | d1= | 9.611 | nd1 | 1.8040 | v1 | 46.57 |
| R2 | −343.229 | d2= | 1.529 |  |  |  |
| R3 | −764.255 | d3= | 1.100 | nd2 | 1.5891 | v2 | 61.25 |
| R4 | 18.265 | d4= | 5.709 |  |  |  |
| R5 | −19.598 | d5= | 1.171 | nd3 | 1.7847 | v3 | 25.72 |
| R6 | 99.873 | d6= | 2.292 |  |  |  |
| R7 | 2562.896 | d7= | 4.898 | nd4 | 1.8810 | v4 | 40.16 |
| R8 | −20.358 | d8= | 3.177 |  |  |  |
| R9 | −19.288 | d9= | 1.100 | nd5 | 1.6034 | v5 | 38.01 |
| R10 | 34.872 | d10= | 0.00 |  |  |  |
| R11 | 34.872 | d11= | 6.869 | nd6 | 1.4565 | v6 | 90.27 |
| R12 | −42.397 | d12= | 0.400 |  |  |  |
| R13 | 60.639 | d13= | 6.328 | nd7 | 1.9229 | v7 | 20.88 |
| R14 | −47.644 | d14= | 1.437 |  |  |  |
| R15 | −36.362 | d15= | 2.015 | nd8 | 1.6034 | v8 | 38.01 |
| R16 | 27.145 | d16= | 0.00 |  |  |  |
| R17 | 27.145 | d17= | 16.000 | nd9 | 1.5540 | v9 | 71.76 |
| R18 | −36.672 | d18= | 0.400 |  |  |  |
| R19 | 32.120 | d19= | 7.470 | nd10 | 1.5714 | v10 | 71.62 |
| R20 | −46.370 | d20= | 0.00 |  |  |  |
| R21 | −46.370 | d21= | 1.709 | nd11 | 1.6989 | v11 | 30.05 |
| R22 | 22.101 | d22= | 7.064 |  |  |  |
| R23 | 27.549 | d23= | 15.162 | nd12 | 1.5941 | v12 | 60.47 |
| R24 | −154.509 | d24= | 19.606 |  |  |  |

Figure 10:
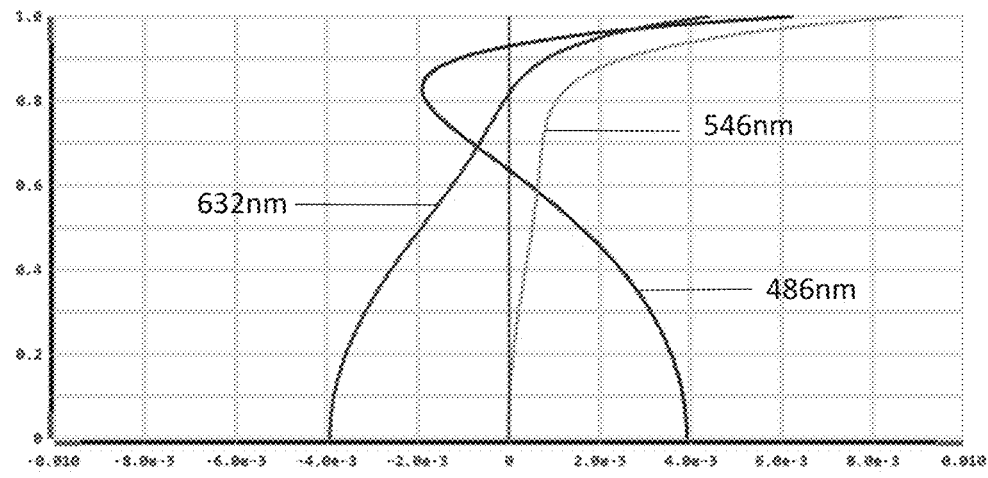
FIG. 10 is a schematic diagram of longitudinal aberration of the camera optical lens shown in FIG. 9.
Figure 11:
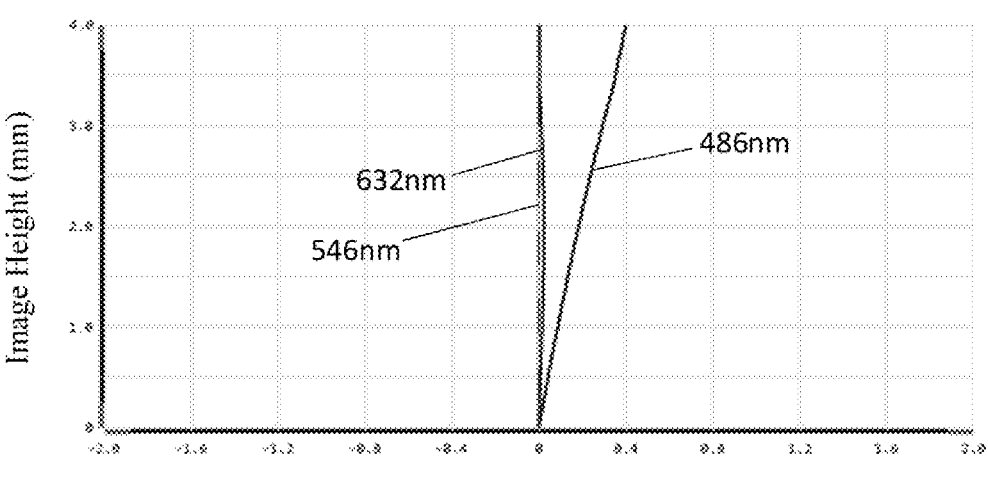
FIG. 11 is a schematic diagram of lateral color of a camera optical lens shown in FIG. 9.
Figure 12:
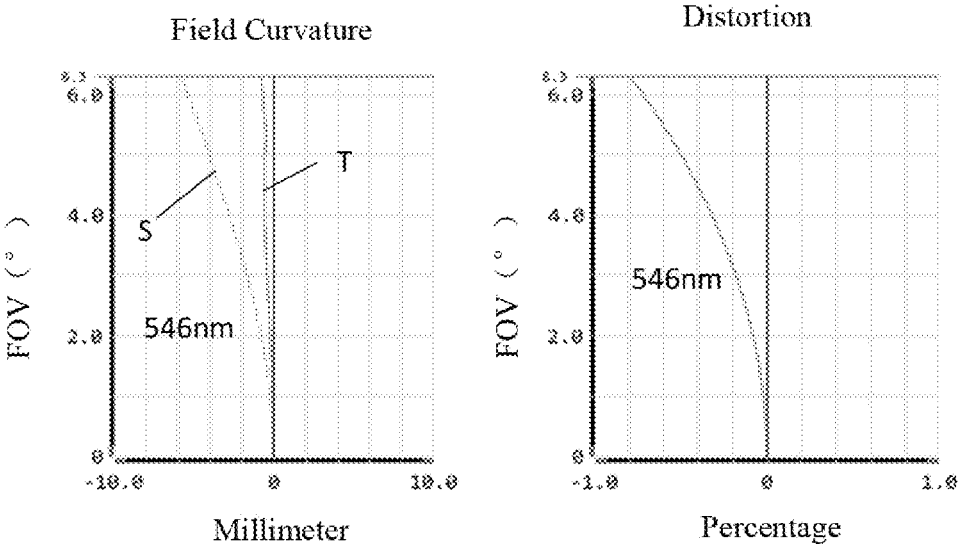
FIG. 12 is a schematic diagram of field curvature and distortion of the camera optical lens shown in FIG. 9.
Figure 13:
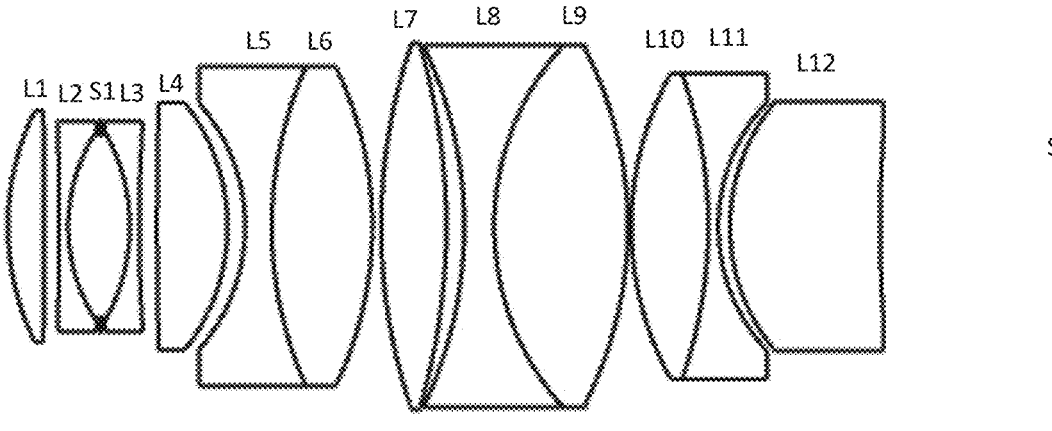
FIG. 13 is a schematic structural diagram of a camera optical lens according to Embodiment 4 of the present disclosure.

FIG. 10 and FIG. 11 respectively show longitudinal aberration and lateral color of light with wavelengths of 632 nm, 546 nm and 486 nm after passing through a camera optical lens 30 according to Embodiment 3. FIG. 12 shows field curvature and distortion of light with a wavelength of 546 nm after passing through the camera optical lens 30 according to Embodiment 3, the field curvature S in FIG. 12 is the field curvature in a sagittal direction, and T is the field curvature in a meridional direction.

Table 7 below shows values corresponding to various values in each example 1, example 2, example 3, example 4, example 5, example 6, and the parameters specified in the relational expression.

As shown in Table 7, Embodiment 3 satisfies each relational expression.

In this embodiment, the entrance pupil diameter of the camera optical lens is 22.500 mm, the numerical aperture is 0.31, the full field image height is 4.0 mm, and the camera optical lens has good optical performance, and characteristics of lower distortion, larger magnification and longer working distance.

Embodiment 4

Embodiment 4 is substantially the same as Embodiment 1, and the symbols have the same meaning as Embodiment 1, and only differences are listed below.

In this embodiment, an aperture S1 is provided between the second lens L2 and the third lens L3, an on-axis distance from an image-side surface of the second lens L2 to the aperture S1 is 3.762 mm, and an on-axis distance from the aperture S1 to an object-side surface of the third lens L3 is 3.386 mm.

In this embodiment, the image-side surface of the first lens L1 is convex in a paraxial region, and the object-side surface of the eighth lens L8 is concave in the paraxial region.

Table 4 shows design data of q camera optical lens 40 according to Embodiment 4 of the present disclosure.

TABLE 4

|  | R | d |  | nd |  | vd |
| --- | --- | --- | --- | --- | --- | --- |
| OBJ |  | dOBJ(WD)= | INF |  |  |  |
| R1 | 31.757 | d1= | 4.163 | nd1 | 1.8040 | v1 | 46.57 |
| R2 | −2207.146 | d2= | 1.742 |  |  |  |
| R3 | −924.555 | d3= | 1.100 | nd2 | 1.5891 | v2 | 61.25 |
| R4 | 20.975 | d4= | 7.148 |  |  |  |
| R5 | −23.199 | d5= | 1.100 | nd3 | 1.7847 | v3 | 25.72 |
| R6 | 192.113 | d6= | 2.060 |  |  |  |
| R7 | 524.129 | d7= | 8.188 | nd4 | 1.8810 | v4 | 40.16 |
| R8 | −24.208 | d8= | 2.057 |  |  |  |
| R9 | −22.593 | d9= | 3.094 | nd5 | 1.6034 | v5 | 38.01 |
| R10 | 47.169 | d10= | 0.00 |  |  |  |
| R11 | 47.169 | d11= | 11.688 | nd6 | 1.4565 | v6 | 90.27 |
| R12 | −44.129 | d12= | 1.006 |  |  |  |
| R13 | 68.094 | d13= | 7.573 | nd7 | 1.9229 | v7 | 20.88 |
| R14 | −77.206 | d14= | 2.088 |  |  |  |
| R15 | −50.982 | d15= | 3.499 | nd8 | 1.6034 | v8 | 38.01 |
| R16 | 32.911 | d16= | 0.00 |  |  |  |
| R17 | 32.911 | d17= | 15.520 | nd9 | 1.5540 | v9 | 71.76 |
| R18 | −47.028 | d18= | 0.400 |  |  |  |
| R19 | 38.153 | d19= | 8.933 | nd10 | 1.5714 | v10 | 71.62 |
| R20 | −55.367 | d20= | 0.00 |  |  |  |
| R21 | −55.367 | d21= | 1.177 | nd11 | 1.6989 | v11 | 30.05 |
| R22 | 22.217 | d22= | 1.348 |  |  |  |
| R23 | 23.421 | d23= | 17.447 | nd12 | 1.5941 | v12 | 60.47 |
| R24 | 160.673 | d24= | 21.107 |  |  |  |

Figure 14:
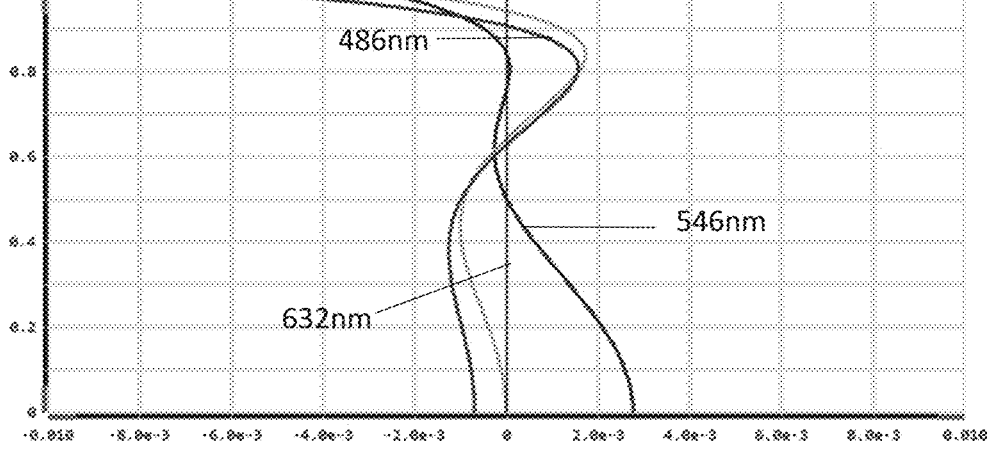
FIG. 14 is a schematic diagram of longitudinal aberration of the camera optical lens shown in FIG. 13.
Figure 15:
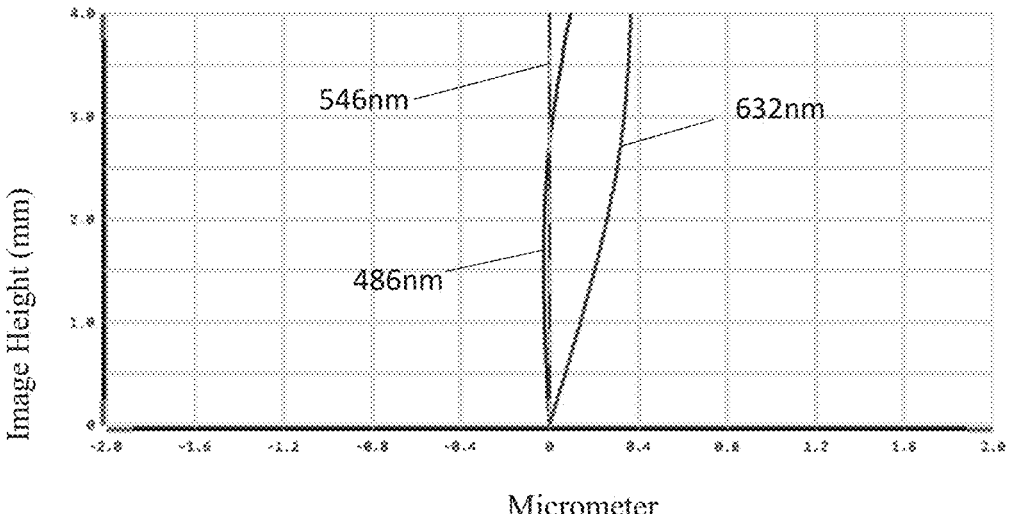
FIG. 15 is a schematic diagram of lateral color of the camera optical lens shown in FIG. 13.
Figure 16:
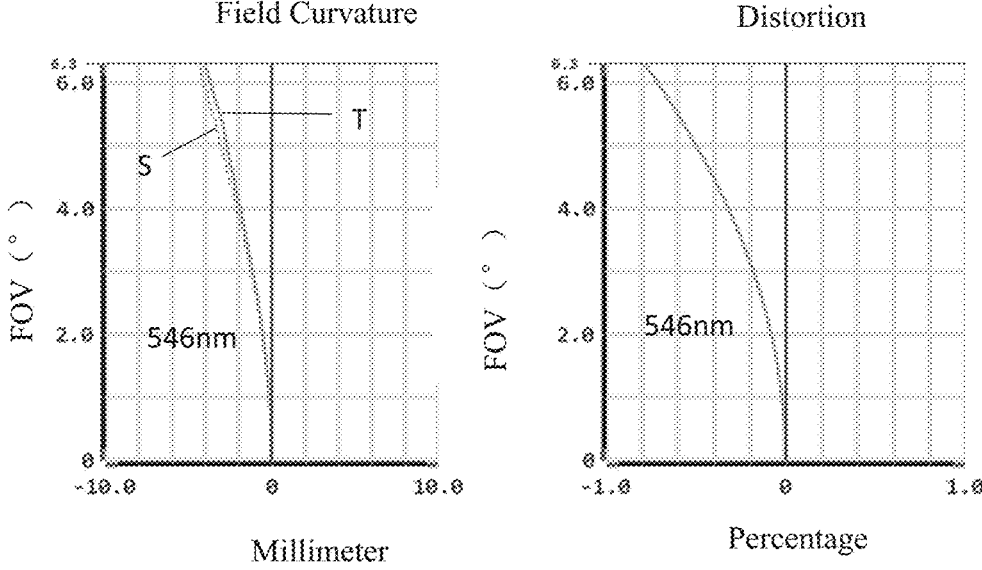
FIG. 16 is a schematic diagram of field curvature and distortion of the camera optical lens shown in FIG. 13.
Figure 17:
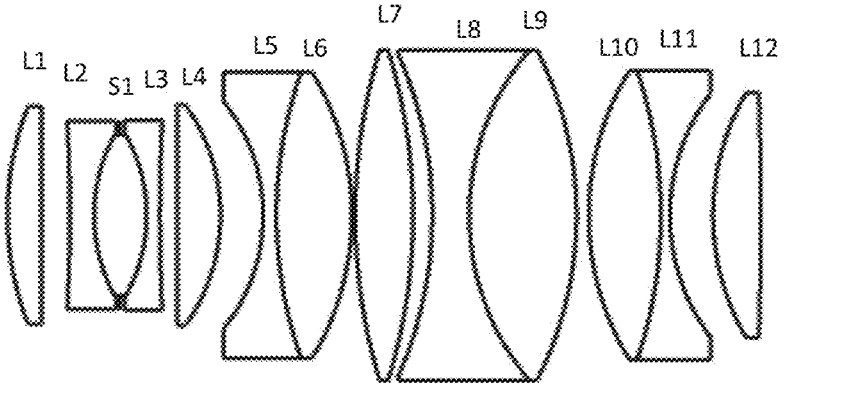
FIG. 17 is a schematic structural diagram of a camera optical lens according to Embodiment 5 of the present disclosure.

FIG. 14 and FIG. 15 respectively show longitudinal aberration and lateral color of light with wavelengths of 632 nm, 546 nm and 486 nm after passing through a camera optical lens 40 according to Embodiment 4. FIG. 16 shows field curvature and distortion of light with a wavelength of 546 nm after passing through the camera optical lens 40 according to Embodiment 4, the field curvature S in FIG. 16 is the field curvature in a sagittal direction, and T is the field curvature in a meridional direction.

Table 7 below shows values corresponding to various values in each example 1, example 2, example 3, example 4, example 5, example 6, and the parameters specified in the relational expression.

As shown in Table 7, Embodiment 4 satisfies each relational expression.

In this embodiment, the entrance pupil diameter of the camera optical lens is 25.250 mm, the numerical aperture is 0.35, the full field image height is 4.0 mm, and the camera optical lens has good optical performance, and characteristics of lower distortion, larger magnification and longer working distance.

Embodiment 5

Embodiment 5 is substantially the same as Embodiment 1, and the symbols have the same meaning as Embodiment 1, and only differences are listed below.

In this embodiment, an aperture S1 is provided between the second lens L2 and the third lens L3, an on-axis distance from an image-side surface of the second lens L2 to the aperture S1 is 3.167 mm, and an on-axis distance from the aperture S1 to an object-side surface of the third lens L3 is 3.244 mm.

In this embodiment, the image-side surface of the first lens L1 is convex in a paraxial region, the object-side surface of the eighth lens L8 is concave in the paraxial region, and the image-side surface of the twelfth lens L12 is convex in the paraxial region.

Table 5 shows design data of a camera optical lens 50 according to Embodiment 5 of the present disclosure.

TABLE 5

| OBJ | R | dOBJ(WD)= | INF | nd | | vd |
|---|---|---|---|---|---|---|
| | | | | d | | |
| R1 | 37.836 | d1= | 4.214 | nd1 | 1.8040 v1 | 46.57 |
| R2 | −1106.053 | d2= | 3.407 | | | |
| R3 | −206.835 | d3= | 2.956 | nd2 | 1.5891 v2 | 61.25 |
| R4 | 21.269 | d4= | 6.412 | | | |
| R5 | −20.976 | d5= | 1.612 | nd3 | 1.7847 v3 | 25.72 |
| R6 | 231.790 | d6= | 2.075 | | | |
| R7 | 3160.842 | d7= | 5.322 | nd4 | 1.8810 v4 | 40.16 |
| R8 | −24.257 | d8= | 5.218 | | | |
| R9 | −23.186 | d9= | 1.624 | nd5 | 1.6034 v5 | 38.01 |
| R10 | 54.244 | d10= | 0.00 | | | |
| R11 | 54.244 | d11= | 9.206 | nd6 | 1.4565 v6 | 90.27 |
| R12 | −35.073 | d12= | 0.400 | | | |
| R13 | 72.437 | d13− | 7.058 | nd7 | 1.9229 v7 | 20.88 |
| R14 | −71.170 | d14= | 2.366 | | | |
| R15 | −50.389 | d15= | 4.500 | nd8 | 1.6034 v8 | 38.01 |
| R16 | 32.574 | d16= | 0.00 | | | |
| R17 | 32.574 | d17= | 13.090 | nd9 | 1.5540 v9 | 71.76 |
| R18 | −46.293 | d18= | 1.501 | | | |
| R19 | 35.245 | d19= | 8.803 | nd10 | 1.5714 v10 | 71.62 |
| R20 | −57.172 | d20= | 0.00 | | | |
| R21 | −57.172 | d21= | 1.100 | nd11 | 1.6989 v11 | 30.05 |
| R22 | 25.803 | d22= | 5.263 | | | |
| R23 | 30.838 | d23= | 5.861 | nd12 | 1.5941 v12 | 60.47 |
| R24 | −425.564 | d24= | 29.772 | | | |

Figure 18:
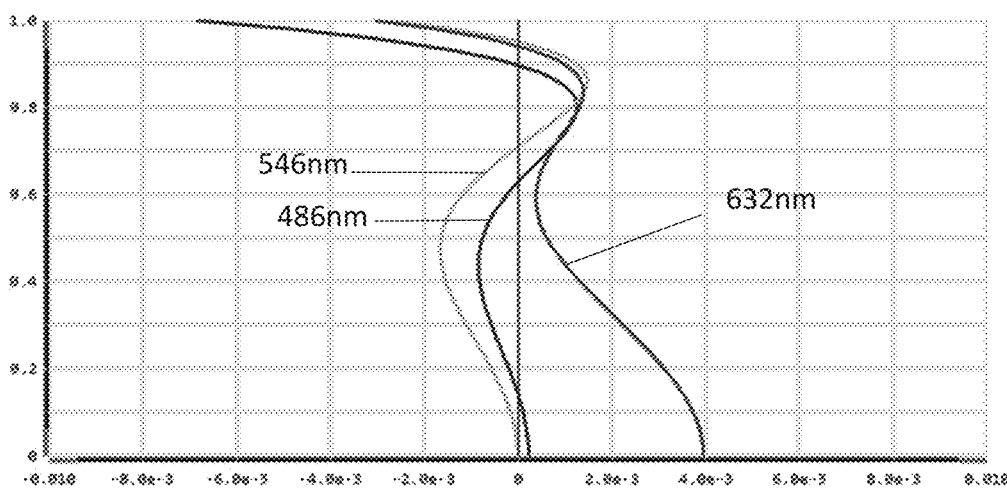
FIG. 18 is a schematic diagram of longitudinal aberration of the camera optical lens shown in FIG. 17.
Figure 19:
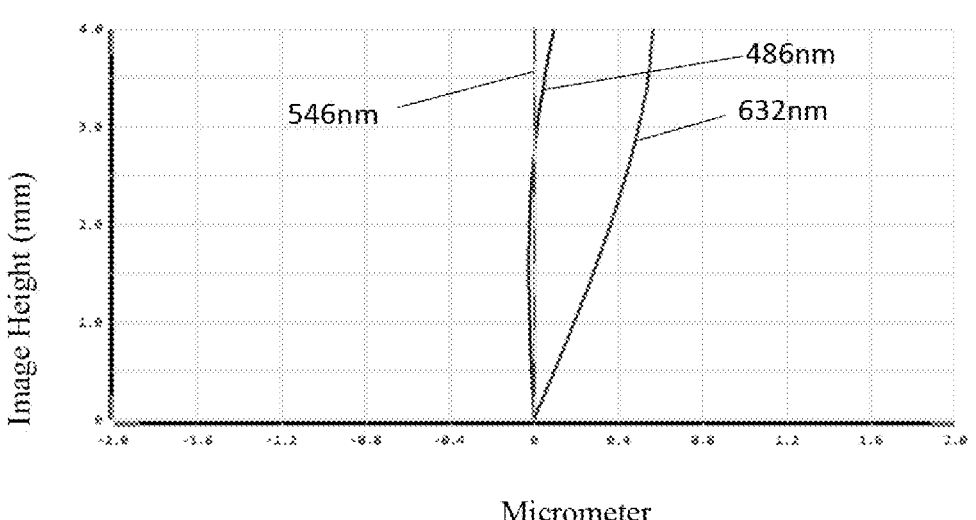
FIG. 19 is a schematic diagram of lateral color of the camera optical lens shown in FIG. 17.
Figure 20:
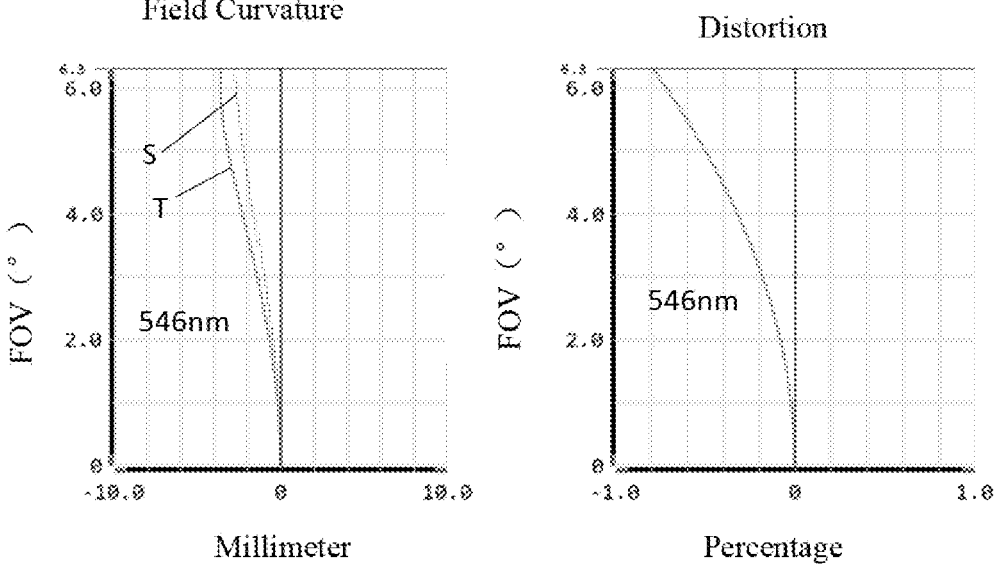
FIG. 20 is a schematic diagram of field curvature and distortion of the camera optical lens shown in FIG. 17.
Figure 21:
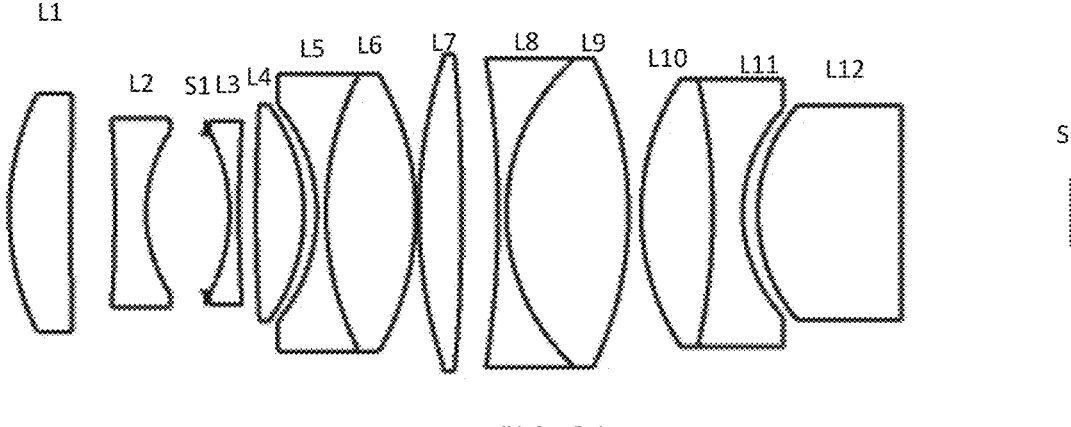
FIG. 21 is a schematic structural diagram of a camera optical lens according to Embodiment 6 of the present disclosure.

FIG. 18 and FIG. 19 respectively show longitudinal aberration and lateral color of light with wavelengths of 632 nm, 546 nm and 486 nm after passing through a camera optical lens 50 according to Embodiment 5. FIG. 20 shows field curvature and distortion of light with a wavelength of 546 nm after passing through the camera optical lens 50 according to Embodiment 5, the field curvature S in FIG. 20 is the field curvature in a sagittal direction, and T is the field curvature in a meridional direction.

Table 7 below shows values corresponding to various values in each example 1, example 2, example 3, example 4, example 5, example 6, and the parameters specified in the relational expression.

As shown in Table 7, Embodiment 5 satisfies each relational expression.

In this embodiment, the entrance pupil diameter of the camera optical lens is 24.000 mm, the numerical aperture is 0.33, the full field image height is 4.0 mm, and the camera optical lens has good optical performance, and characteristics of lower distortion, larger magnification and longer working distance.

Embodiment 6

Embodiment 6 is substantially the same as Embodiment 1, and the symbols have the same meaning as Embodiment 1, and only differences are listed below.

In this embodiment, an aperture S1 is provided between the second lens L2 and the third lens L3, an on-axis distance from an image-side surface of the second lens L2 to the aperture S1 is 6.944 mm, and an on-axis distance from the aperture S1 to an object-side surface of the third lens L3 is 2.811 mm.

In this embodiment, the image-side surface of the first lens L1 is convex in a paraxial region, and the object-side surface of the eighth lens L8 is concave in the paraxial region.

Table 6 shows design data of the camera optical lens 60 according to Embodiment 6 of the present disclosure.

TABLE 6

| | R | d | | nd | | vd |
|---|---|---|---|---|---|---|
| OBJ | | dOBJ(WD) = | INF | | | |
| R1 | 32.602 | d1 = | 7.228 | nd1 | 1.6134 | v1 44.11 |
| R2 | 939.232 | d2 = | 5.109 | | | |
| R3 | −178.532 | d3 = | 3.675 | nd2 | 1.5168 | v2 64.20 |
| R4 | 18.134 | d4 = | 9.755 | | | |
| R5 | −21.446 | d5 = | 1.096 | nd3 | 1.7618 | v3 26.61 |
| R6 | 151.343 | d6 = | 2.014 | | | |
| R7 | 204.420 | d7 = | 5.604 | nd4 | 1.8810 | v4 40.16 |
| R8 | −22.259 | d8 = | 1.503 | | | |
| R9 | −20.736 | d9 = | 1.100 | nd5 | 1.6034 | v5 38.01 |
| R10 | 37.434 | d10 = | 0.00 | | | |
| R11 | 37.434 | d11 = | 10.478 | nd6 | 1.4586 | v6 90.19 |
| R12 | −33.871 | d12 = | 0.400 | | | |
| R13 | 60.261 | d13 = | 5.000 | nd7 | 1.9229 | v7 20.88 |
| R14 | −215.650 | d14 = | 4.249 | | | |
| R15 | −120.731 | d15 = | 1.000 | nd8 | 1.6034 | v8 38.01 |
| R16 | 25.202 | d16 = | 0.00 | | | |
| R17 | 25.202 | d17 = | 14.271 | nd9 | 1.5540 | v9 71.76 |
| R18 | −43.080 | d18 = | 1.500 | | | |
| R19 | 29.723 | d19 = | 8.368 | nd10 | 1.5714 | v10 71.62 |
| R20 | −74.717 | d20 = | 0.00 | | | |
| R21 | −74.717 | d21 = | 3.525 | nd11 | 1.7995 | v11 42.25 |
| R22 | 18.848 | d22 = | 1.773 | | | |
| R23 | 20.117 | d23 = | 16.802 | nd12 | 1.5935 | v12 67.00 |
| R24 | 1481.882 | d24 = | 20.034 | | | |

Figure 22:
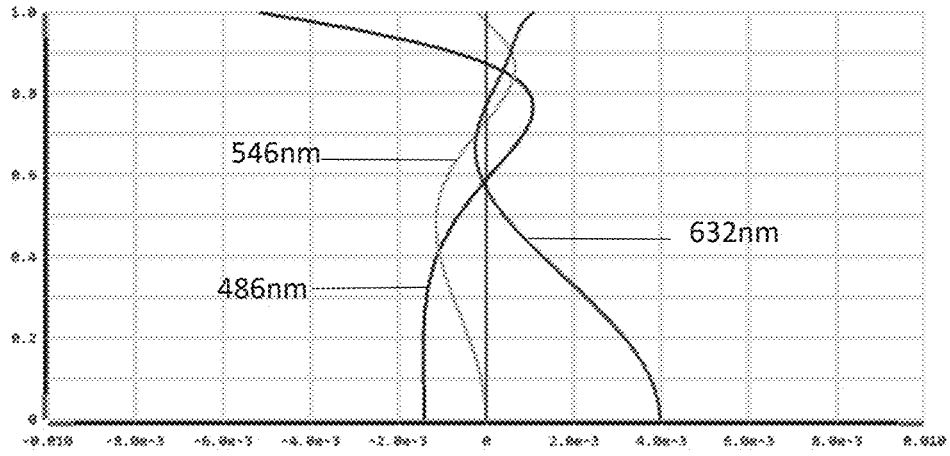
FIG. 22 is a schematic diagram of longitudinal aberration of the camera optical lens shown in FIG. 21.
Figure 23:
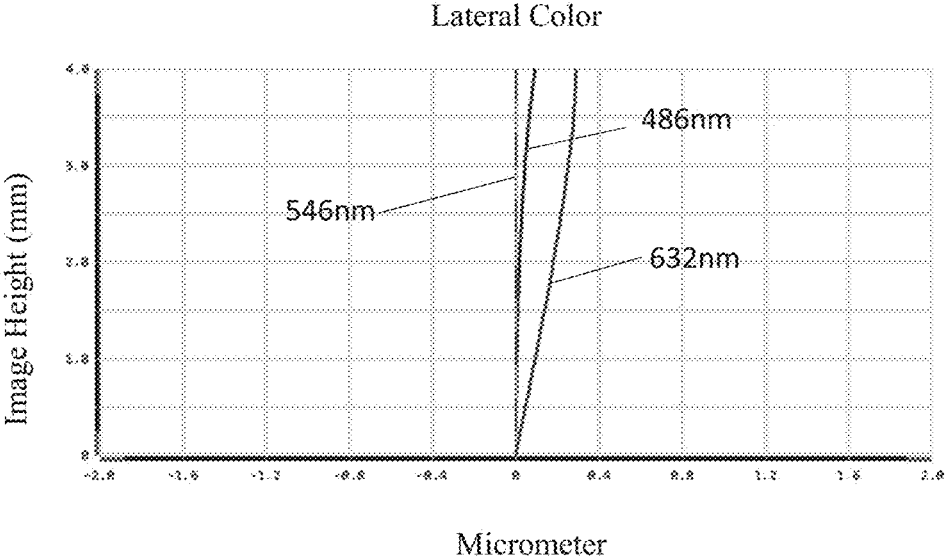
FIG. 23 is a schematic diagram of lateral color of the camera optical lens shown in FIG. 21.
Figure 24:
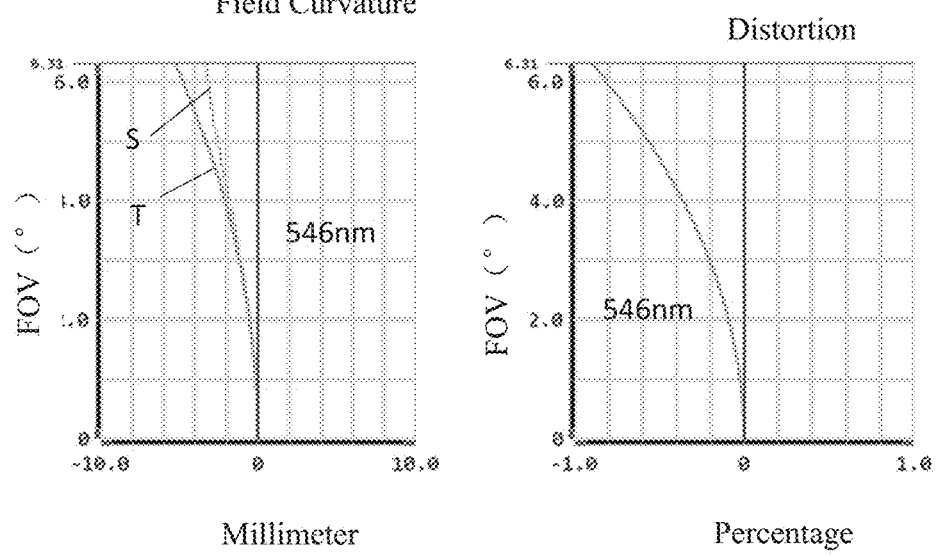
FIG. 24 is a schematic diagram of field curvature and distortion of the camera optical lens shown in FIG. 21.

FIG. 22 and FIG. 23 respectively show longitudinal aberration and lateral color of light with wavelengths of 632 nm, 546 nm and 486 nm after passing through a camera optical lens 30 according to Embodiment 6. FIG. 24 shows field curvature and distortion of light with a wavelength of 546 nm after passing through the camera optical lens 50 according to Embodiment 6, the field curvature S in FIG. 24 is the field curvature in a sagittal direction, and T is the field curvature in a meridional direction.

Table 7 below shows values corresponding to various values in each example 1, example 2, example 3, example 4, example 5, example 6, and the parameters specified in the relational expression.

As shown in Table 7, Embodiment 6 satisfies each relational expression.

In this embodiment, the entrance pupil diameter of the camera optical lens is 23.000 mm, the numerical aperture is 0.32, the full field image height is 4.0 mm, and the camera optical lens has good optical performance, and characteristics of lower distortion, larger magnification and longer working distance.

TABLE 7

| Parameters and Relational Expression | Example 1 | Example 2 | Example 3 | Example 4 | Example 5 | Example 6 |
|---|---|---|---|---|---|---|
| f12/f10__11 | −0.785 | −0.612 | −0.543 | −0.696 | −0.503 | −0.695 |
| f7/f | 1.746 | 1.108 | 0.806 | 1.090 | 1.080 | 1.395 |
| f56/(T5 + T6) | −82.368 | −5.240 | −5.454 | −4.030 | −6.980 | −5.330 |
| NA*f/WD | 0.471 | 0.480 | 0.574 | 0.598 | 0.403 | 0.574 |
| f | 36.004 | 35.993 | 36.499 | 36.495 | 36.493 | 36.496 |
| f1 | 56.748 | 41.227 | 35.837 | 38.772 | 45.346 | 54.599 |
| f2 | −38.256 | −33.264 | −30.146 | −34.663 | −32.452 | −31.534 |
| f3 | −23.544 | −24.839 | −20.599 | −26.080 | −24.221 | −24.373 |
| f4 | 34.012 | 26.429 | 22.811 | 26.294 | 27.184 | 22.917 |
| f5 | −41.487 | −25.450 | −20.298 | −24.744 | −26.542 | −21.821 |
| f6 | 48.203 | 49.143 | 43.004 | 51.897 | 48.094 | 40.549 |
| f7 | 62.854 | 39.868 | 29.419 | 39.771 | 39.402 | 50.914 |

TABLE 7-continued

| Parameters and Relational Expression | Example 1 | Example 2 | Example 3 | Example 4 | Example 5 | Example 6 |
|---|---|---|---|---|---|---|
| f8 | −110.607 | −32.856 | −25.294 | −32.428 | −31.930 | −34.250 |
| f9 | 64.428 | 37.707 | 30.826 | 37.431 | 36.569 | 30.916 |
| f10 | 34.942 | 40.788 | 34.286 | 40.817 | 39.396 | 38.203 |
| f11 | −19.212 | −23.583 | −21.030 | −22.366 | −25.100 | −18.411 |
| f12 | 47.255 | 45.804 | 40.458 | 43.885 | 48.442 | 34.093 |

The above description is only embodiments of the present disclosure, and it should be noted that those skilled in the art can also make improvements without departing from the concept of the present disclosure, but these all will fall within the protection scope of the present disclosure.

What is claimed is:

1. A camera optical lens, comprising from an object side to an image side: a first lens, a second lens, a third lens, a fourth lens, a fifth lens, a sixth lens, a seventh lens, an eighth lens, a ninth lens, a tenth lens, an eleventh lens, and a twelfth lens;

wherein a focal length of the camera optical lens is f, a combined focal length of the fifth lens and the sixth lens is f56, an on-axis thickness of the fifth lens is d9, an on-axis thickness of the sixth lens is d11, a focal length of the seventh lens is f7, a combined focal length of the tenth lens and the eleventh lens is f10_11, a focal length of the twelfth lens is f12, a working distance of the camera optical lens is WD, and a numerical aperture of the camera optical lens is NA, following relational expressions are satisfied:

$$-0.80 \leq f12/f10\_11 \leq -0.50;$$

$$0.80 \leq f7/f \leq 1.80;$$

$$-83.00 \leq f56/(d9 + d11) \leq -4.00;$$

and $$0.40 \leq NA * f/WD \leq 0.60.$$

2. The camera optical lens as described in claim 1, wherein an on-axis thickness of the fourth lens d7, an on-axis distance from an image-side surface of the fourth lens to an object-side surface of the fifth lens d8, a following relational expression is satisfied:

$$1.00 \leq d7/d8 \leq 22.50.$$

3. The camera optical lens as described in claim 1, wherein the first lens has a positive refractive power, and an object-side surface of the first lens is convex in a paraxial region;

a focal length of the first lens is f1, a central curvature radius of the object-side surface of the first lens is R1, a central curvature radius of an image-side surface of the first lens is R2, an on-axis thickness of the first lens is d1, and a total optical length from the object-side surface of the first lens to an image plane of the camera optical lens along an optic axis of the camera optical lens is TTL, following relational expressions are satisfied:

$$0.98 \leq f1/f \leq 1.58;$$

$$-1.26 \leq (R1 + R2)/(R1 - R2) \leq -0.83;$$

and $$0.02 \leq d1/TTL \leq 0.09.$$

4. The camera optical lens as described in claim 1, wherein the second lens has a negative refractive power, an object-side surface of the second lens is concave in a paraxial region, and an image-side surface of the second lens is concave in the paraxial region;

a focal length of the second lens is f2, a central curvature radius of an object-side surface of the second lens is R3, a central curvature radius of an image-side surface of the second lens is R4, an on-axis thickness of the second lens is d3, and a total optical length from an object-side surface of the first lens to an image plane of the camera optical lens along an optic axis of the camera optical lens is TTL, following relational expressions are satisfied:

$$-1.10 \leq f2/f \leq -0.80;$$

$$0.78 \leq (R3 + R4)/(R3 - R4) \leq 0.96;$$

and $$0.00 \leq d3/TTL \leq 0.03.$$

5. The camera optical lens as described in claim 1, wherein the third lens has a negative refractive power, an object-side surface of the third lens is concave in a paraxial region, and an image-side surface of the third lens is concave in the paraxial region;

a focal length of the third lens is f3, a central curvature radius of an object-side surface of the third lens is R5, a central curvature radius of an image-side surface of the third lens is R6, an on-axis thickness of the third lens is d5, and a total optical length from an object-side surface of the first lens to an image plane of the camera optical lens along an optic axis of the camera optical lens is TTL, following relational expressions are satisfied:

$$-0.75 \leq f3/f \leq -0.56;$$

$$-0.85 \leq (R5 + R6)/(R5 - R6) \leq -0.30;$$

and $$0.00 \leq d5/TTL \leq 0.03.$$

6. The camera optical lens as described in claim 1, wherein the fourth lens has a positive refractive power, an object-side surface of the fourth lens is convex in a paraxial region, and an image-side surface of the fourth lens is convex in the paraxial region;

a focal length of the fourth lens is f4, a central curvature radius of an object-side surface of the fourth lens is R7, a central curvature radius of an image-side surface of the fourth lens is R8, an on-axis thickness of the fourth lens is d7, and a total optical length from an object-side surface of the first lens to an image plane of the camera optical lens along an optic axis of the camera optical lens is TTL, following relational expressions are satisfied:

$$0.62 \le f4/f \le 0.95;$$

$$0.16 \le (R7 + R8)/(R7 - R8) \le 1.00;$$

and $$0.04 \le d7/TTL \le 0.10.$$

7. The camera optical lens as described in claim 1, wherein the fifth lens has a negative refractive power, an object-side surface of the fifth lens is concave in a paraxial region, and an image-side surface of the fifth lens is concave in the paraxial region;

a focal length of the fifth lens is f5, a central curvature radius of an object-side surface of the fifth lens is R9, a central curvature radius of an image-side surface of the fifth lens is R10, and a total optical length from an object-side surface of the first lens to an image plane of the camera optical lens along an optic axis of the camera optical lens is TTL, following relational expressions are satisfied:

$$-1.20 \le f5/f \le -0.55;$$

$$-0.41 \le (R9 + R10)/(R9 - R10) \le -0.24.$$

and $$0.00 \le d9/TTL \le 0.03.$$

8. The camera optical lens as described in claim 1, wherein the sixth lens has a positive refractive power, an object-side surface of the sixth lens is convex in a paraxial region, and an image-side surface of the sixth lens is convex in the paraxial region;

a focal length of the sixth lens is f6, a central curvature radius of an object-side surface of the sixth lens is R11, a central curvature radius of an image-side surface of the sixth lens is R12, and a total optical length from an object-side surface of the first lens to an image plane of the camera optical lens along an optic axis of the camera optical lens is TTL, following relational expressions are satisfied:

$$1.11 \le f6/f \le 1.45;$$

$$-0.10 \le (R11 + R12)/(R11 - R12) \le 0.25;$$

and $$0.05 \le d11/TTL \le 0.10.$$

9. The camera optical lens as described in claim 1, wherein the seventh lens has a positive refractive power, an object-side surface of the seventh lens is convex in a paraxial region, and an image-side surface of the seventh lens is convex in the paraxial region;

a central curvature radius of the object-side surface of the seventh lens is R13, a central curvature radius of the image-side surface of the seventh lens is R14, an on-axis thickness of the seventh lens is d13, and a total optical length from an object-side surface of the first lens to an image plane of the camera optical lens along an optic axis of the camera optical lens is TTL, following relational expressions are satisfied:

$$-0.60 \le (R13 + R14)/(R13 - R14) \le 0.15;$$

and $$0.04 \le d13/TTL \le 0.07.$$

10. The camera optical lens as described in claim 1, wherein the eighth lens has a negative refractive power, and an image-side surface of the eighth lens is concave in a paraxial region;

a focal length of the eighth lens is f8, a central curvature radius of an object-side surface of the eighth lens is R15, a central curvature radius of an image-side surface of the eighth lens is R16, an on-axis thickness of the eighth lens is d15, and a total optical length from an object-side surface of the first lens to an image plane of the camera optical lens along an optic axis of the camera optical lens is TTL, following relational expressions are satisfied:

$$-3.10 \le f8/f \le -0.69;$$

$$0.14 \le (R15 + R16)/(R15 - R16) \le 3.00;$$

and $$0.00 \le d15/TTL \le 0.04.$$

11. The camera optical lens as described in claim 1, wherein the ninth lens has a positive refractive power, an object-side surface of the ninth lens is convex in a paraxial region, and an image-side surface of the ninth lens is convex in the paraxial region;

a focal length of the ninth lens is f9, a central curvature radius of an object-side surface of the ninth lens is R17, a central curvature radius of an image-side surface of the ninth lens is R18, an on-axis thickness of the ninth lens is d17, and a total optical length from an object-side surface of the first lens to an image plane of the camera optical lens along an optic axis of the camera optical lens is TTL, following relational expressions are satisfied:

$$0.84 \le f9/f \le 1.79;$$

$$-0.90 \le (R17 + R18)/(R17 - R18) \le -0.14;$$

and $$0.08 \le d17/TTL \le 0.14.$$

12. The camera optical lens as described in claim 1, wherein the tenth lens has a positive refractive power, an object-side surface of the tenth lens is convex in a paraxial region, and an image-side surface of the tenth lens is convex in the paraxial region;

a focal length of the tenth lens is f10, a central curvature radius of an object-side surface of the tenth lens is R19, a central curvature radius of an image-side surface of the tenth lens is R20, an on-axis thickness of the tenth lens is d19, an on-axis thickness of the tenth lens is d19, and a total optical length from an object-side surface of the first lens to an image plane of the camera optical lens along an optic axis of the camera optical lens is TTL, following relational expressions are satisfied:

$$0.90 \le f10/f \le 1.15;$$

$$-0.45 \le (R19 + R20)/(R19 - R20) \le 0.00;$$

and $$0.06 \le d19/TTL \le 0.15.$$

13. The camera optical lens as described in claim 1, wherein the eleventh lens has a negative refractive power, an object-side surface of the eleventh lens is concave in a paraxial region, and an image-side surface of the eleventh lens is concave in the paraxial region;

a focal length of the eleventh lens is f11, a central curvature radius of an object-side surface of the eleventh lens is R21, a central curvature radius of an image-side surface of the eleventh lens is R22, an on-axis thickness of the eleventh lens is d21, and a total optical length from an object-side surface of the first lens to an image plane of the camera optical lens along an optic axis of the camera optical lens is TTL, following relational expressions are satisfied:

$$-0.69 \le f11/f \le -0.50;$$

$$0.35 \le (R21 + R22)/(R21 - R22) \le 0.60;$$

and $$0.00 \le d21/TTL \le 0.03.$$

14. The camera optical lens as described in claim 1, wherein the twelfth lens has a positive refractive power, and an object-side surface of the twelfth lens is convex in a paraxial region;

a focal length of the twelfth lens is f12, a central curvature radius of an object-side surface of the twelfth lens is R23, a central curvature radius of an image-side surface of the twelfth lens is R24, an on-axis thickness of the twelfth lens is d23, and a total optical length from an object-side surface of the first lens to an image plane of the camera optical lens along an optic axis of the camera optical lens is TTL, following relational expressions are satisfied:

$$0.93 \le f12/f \le 1.33;$$

$$-1.35 \le (R23 + R24)/(R23 - R24) \le -0.65;$$

and $$0.04 \le d23/TTL \le 0.15.$$

15. The camera optical lens as described in claim 1, wherein the first lens, the second lens, the third lens, the fourth lens, the fifth lens, the sixth lens, the seventh lens, the eighth lens, the ninth lens, the tenth lens, the eleventh lens and the twelfth lens are all made of glass.

\* \* \* \* \*